(12) United States Patent
Pretorius

(10) Patent No.: US 11,199,681 B2
(45) Date of Patent: Dec. 14, 2021

(54) COMPACT CAMERA LENS OF HIGHEST IMAGING QUALITY FOR A CAMERA WITH FULL-FRAMED SENSOR

(71) Applicant: Carl Zeiss AG, Oberkochen (DE)

(72) Inventor: Marco Pretorius, Oberkochen (DE)

(73) Assignee: Carl Zeiss AG, Oberkochen (DE)

(*) Notice: Subject to any disclaimer, the term of this patent is extended or adjusted under 35 U.S.C. 154(b) by 733 days.

(21) Appl. No.: 15/845,541

(22) Filed: Dec. 18, 2017

(65) Prior Publication Data

US 2018/0180842 A1 Jun. 28, 2018

(30) Foreign Application Priority Data

Dec. 22, 2016 (DE) .......................... 102016125402.9

(51) Int. Cl.
| | | |
|---|---|---|
| *G02B 15/14* | (2006.01) | |
| *G02B 9/12* | (2006.01) | |
| *G02B 13/00* | (2006.01) | |
| *G02B 7/04* | (2021.01) | |
| *G02B 7/08* | (2021.01) | |
| *G02B 13/18* | (2006.01) | |

(52) U.S. Cl.
CPC ................ *G02B 9/12* (2013.01); *G02B 7/04* (2013.01); *G02B 7/08* (2013.01); *G02B 13/006* (2013.01); *G02B 13/0045* (2013.01); *G02B 13/18* (2013.01)

(58) Field of Classification Search
CPC ........ G02B 9/12; G02B 13/0045; G02B 7/04; G02B 13/006; G02B 13/18; G02B 13/0035
See application file for complete search history.

(56) References Cited

U.S. PATENT DOCUMENTS

| | | | |
|---|---|---|---|
| 4,416,518 A | 11/1983 | Hugues et al. | |
| 4,456,345 A | 6/1984 | Fujibayashi | |
| 5,745,299 A * | 4/1998 | Iwata | G02B 15/143103 |
| | | | 359/684 |
| 5,986,821 A | 11/1999 | Yoon | |
| 6,002,529 A | 12/1999 | Kohno et al. | |
| 8,369,029 B2 | 2/2013 | Tang et al. | |
| 8,373,932 B2 | 2/2013 | Wang et al. | |

(Continued)

FOREIGN PATENT DOCUMENTS

| | | |
|---|---|---|
| CN | 1282881 A | 2/2001 |
| CN | 1928614 A | 3/2007 |

(Continued)

*Primary Examiner* — Joseph P Martinez
(74) *Attorney, Agent, or Firm* — Muirhead and Saturnelli, LLC

(57) ABSTRACT

A camera lens, e.g., for a full-frame camera, may have a first compound lens leading on the object side, a second compound lens following the first compound lens, a third compound lens that terminates on the sensor side and follows the second compound lens, and an aperture stop arranged between the first compound lens and the second compound lens. The first compound lens may have a converging refractive power. The second compound lens may comprise at least two lens elements arranged movably along the optical axis, and the third compound lens may have at least one aspheric lens element which is fixedly arranged in the longitudinal direction of the optical axis, wherein the aspheric lens element has a diameter of at least 25 mm.

31 Claims, 13 Drawing Sheets

(56) References Cited

U.S. PATENT DOCUMENTS

| | | |
|---|---|---|
| 8,964,307 B2 | 2/2015 | Chang et al. |
| 9,025,258 B2 | 5/2015 | Chen et al. |
| 9,036,276 B2 | 5/2015 | Liou et al. |
| 9,116,328 B2 | 8/2015 | Chang et al. |
| 9,217,843 B2 | 12/2015 | Liou et al. |
| 9,235,030 B2 | 1/2016 | Yoneyama et al. |
| 9,310,590 B1 | 4/2016 | Liao |
| 2006/0056042 A1 | 3/2006 | Kim et al. |
| 2011/0228160 A1 | 9/2011 | Imaoka et al. |
| 2015/0177492 A1 | 6/2015 | Kanda et al. |
| 2015/0002123 A1 | 7/2015 | Chen et al. |
| 2015/0198790 A1 | 7/2015 | Tanaka et al. |
| 2015/0212389 A1 | 7/2015 | Chen et al. |
| 2016/0011399 A1 | 1/2016 | Hashimoto |

FOREIGN PATENT DOCUMENTS

| | | |
|---|---|---|
| DE | 10 2004 060 786 A1 | 3/2006 |
| EP | E 0 881 516 A1 | 12/1998 |
| JP | S 64-74517 A | 3/1989 |
| JP | H 06-281863 A | 10/1994 |
| JP | 11-142741 | 5/1999 |
| JP | H 11-142741 A | 5/1999 |
| JP | 2009-145587 A | 7/2009 |
| JP | 2009-145589 A | 7/2009 |
| JP | 2011-197472 A | 10/2011 |

\* cited by examiner

COMPACT CAMERA LENS OF HIGHEST IMAGING QUALITY FOR A CAMERA WITH FULL-FRAMED SENSOR

TECHNICAL FIELD

The system described herein relates to a camera lens which is compact, has a highest imaging quality and may be configured for use with a camera having a full-frame sensor. The system described herein additionally relates to a still or film camera.

BACKGROUND

The ever-advancing improvement of photo and film cameras having a pixel density of by now 50 million pixels on a surface area of 24 mm×36 mm and the resulting pixel size of approx. 4 µm per edge length leads to ever increasing requirements regarding the camera lens that is connected upstream. The optical transfer function used to determine the image quality for a system, consisting of a camera lens and a camera, now no longer primarily depends on the modulation transfer function of the sensor, but is more dependent on the modulation transfer function of the camera lens. The modulation transfer function here shows the respective contrast for line pairs with different intermediate distance and different line width. Camera lenses are frequently assessed according to the contrast value of the modulation transfer function at 80 line pairs per millimetre. A camera lens that has a modulation transfer function at which, at 80 line pairs per millimetre, a wavelength-independent contrast of at least 50% is achieved, and a modulation transfer function, at which, at 80 line pairs per millimetre, a contrast of at least 70% is achieved if the beam was trimmed to 80%, is referred to as a lens having an extraordinarily high image quality. This image quality is typically not achieved by normal camera lenses, even if they are typically large and heavy. In addition to the image quality, the lens size also plays an important role in refining the optical design. Particularly lightweight and compact camera lenses typically have a structural length of less than or equal to 1.5 times the image circle diameter.

Modern camera lenses now have fast internal focusing having focusing times of typically less than or equal to 100 ms. Such camera lenses furthermore have a large object distance range. The minimum object distance from the centre is here typically less than or equal to ten times the lens focal length. It is also typically required here for a high image quality to be maintained in the near setting range. In order to permit in modern camera lenses the use of actuator modules that are adapted for very short focusing times, the mass of the lens elements to be moved should preferably amount to at most 20 g to 30 g. In the case of a larger mass of the lens elements to be moved, the resulting acceleration forces can override typical actuator modules.

The setup of modern sensors for still or film cameras necessitates that the angle of incidence of the chief rays on the sensor is not greater than 30°, so that no undesired shading of the pixels at the field edge occurs. The angle of incidence of the chief rays on the sensor is preferably not greater than 26°.

Camera lenses that are used together with optics attachments should comply with the not-trivial demand that the image quality remain intact over the entire object distance range without significant deterioration.

Some of the previously mentioned conditions are already met by lens designs for smartphone cameras. By way of example, US 2015/0198790 A1 describes an extremely compact construction for a mobile phone camera optical unit that meets the above-stated criterion with respect to the structural length and the criterion with respect to the angle of incidence on the image sensor. The criterion for the position of the entrance pupil is also met, because in known mobile phone camera lenses, the aperture stop is frequently given by the enclosure around the first lens element itself. In this case, the entrance pupil is equal to the aperture stop and thus constant.

US 2015/0198790 A1 and U.S. Pat. No. 8,369,029 B2 and DE 10 2004 060 786 A1 each disclose different lens designs for mobile phone cameras. The disclosed arrangements of the lens elements of the respective camera lenses include aspheric lens elements which have inflection points in the region of the optical used surface. An aspheric lens element having an inflection point changes the sign of the refractive power for different regions of the beam that passes through the aspheric lens element. An aspheric lens element having an inflection point, for example, can have a diverging effect for beam along the optical axis and a collecting effect for a beam along the margin. The use of such aspheric lens elements having inflection points is typical of most mobile phone camera lenses.

Optical designs for camera lenses having aspheric lens elements with inflection points are disclosed in U.S. Pat. No. 9,310,590 B1, in US 2016/0011399 A1, in US 2015/0212389 A1, in U.S. Pat. No. 8,964,307 B2, in U.S. Pat. No. 8,373,932 B2, in U.S. Pat. No. 9,116,328 B2, in U.S. Pat. No. 9,025,258 B2, in U.S. Pat. No. 9,036,276 B2, in U.S. Pat. No. 9,217,843 B2, in U.S. Pat. No. 9,235,030 B2 and in US 2015/0177492 A1.

U.S. Pat. No. 4,416,518 discloses a camera lens for a colour film camera. The camera lens comprises a plurality of movable lens element components and at least one stationary lens element component group. At least two of the components have an aspheric surface. The movable components consist of individual lens elements, of which at least one lens element has an aspheric surface, while the positionally fixed lens element component group can have at least one aspheric surface.

A zoom lens having two movable compound lenses is disclosed in U.S. Pat. No. 5,986,821. A camera lens having three compound lenses and a movably arranged internal biconvex lens element is disclosed in U.S. Pat. No. 4,456,345.

However, in all known setups for mobile phone camera lenses, the image quality, if the optical design is scaled such that the image circle diameter corresponds to the full-frame, does not approximate the required >50% contrast at 80 line pairs per millimetre in the modulation transfer function. In particular, the correction of chromatic aberrations is entirely insufficient in mobile phone camera lenses due to the avoidance of any cemented elements, as they are known. Furthermore, only focusing by way of displacing the entire lens is provided in mobile phone camera lenses. Yet, the image quality already drops sharply at 20 to 30 times the lens focal length. In addition, the failure to meet the high requirements in terms of image quality in the near setting is consequently even more pronounced.

The production of aspheric lens elements having inflection points for full-frame sensors poses significant challenges for manufacturers. Such aspheres may be able to be produced cost effectively for very small diameters of a few millimetres (typically <8 mm) by way of blank pressing, but not for the very much larger lens diameters that are required for a camera with a full-frame sensor (typically at least 25 mm to 30 mm).

SUMMARY OF THE INVENTION

Described herein is an advantageous camera lens, e.g., for still or film cameras with full-frame sensors, that is compact and provides the highest image quality. Also described herein is an advantageous still or film camera.

Some embodiments of the system described herein include a camera lens for a full-frame camera having a first compound lens leading on the object side, a second compound lens following the first compound lens, a third compound lens that terminates on the sensor side and follows the second compound lens, and an aperture stop arranged between the first compound lens and the second compound lens. The first compound lens has a converging refractive power. In some embodiments, the second compound lens, which can likewise have a converging refractive power, comprises at least two lens elements which are movably arranged along the optical axis, the third compound lens has at least one aspheric lens element having a diameter of at least 25 mm, which is arranged fixedly in the longitudinal direction of the optical axis and, in some embodiments, has no inflection points at least in the optically used region. An aspheric lens element is considered to be a lens element that has an aspheric design in the optically used region of at least one of the lens surfaces. However, it is also possible in particular for the lens surface having an aspheric design to extend beyond the optically used region and to make up the entire lens surface.

In some embodiments, the camera lens according to the system described herein makes it possible to provide a camera lens that has a sufficient image quality even for a full-frame sensor, i.e. has a polychromatic modulation transfer function at which a contrast of more than 50% at 80 line pairs per millimetre is achieved. In some embodiments, the polychromatic modulation transfer function is a weighted average over modulation transfer functions at different wavelengths. In addition, there is the possibility, in particular if the aspheric lens element has no inflection points, of producing a lens according to the system described herein exclusively from spherical lens elements or from aspheric lens elements that are producible by way of blank pressing, which offers cost-effective production. Furthermore, specific requirements relating to the position of the entrance pupil of the optical unit can be met, as a result of which the boundary conditions for a compact camera lens having highest imaging quality are able to be met for a camera with full-frame sensor.

The second compound lens can comprise, along the optical axis, at least one object-side partial compound lens and at least one image-side partial compound lens. The object-side partial compound lens has a diverging refractive power and the image-side partial compound lens has a converging refractive power.

In addition, the object-side partial compound lens and the image-side partial compound lens can be differently displaceable along the optical axis. In particular, the object-side partial compound lens and the image-side partial compound lens can be arranged to be displaceable such that they move in the same direction when focusing at shorter object distances. Generally, both compound lenses move in the same direction (towards the object side) when focusing at shorter object distances. When focusing at changed object distances, the displacement paths of the object-side partial compound lens and the image-side partial compound lens along the optical axis can differ. In particular, the focusing travel of the image-side partial compound lens can be greater by a factor of between 2 and 3 with respect to the focusing travel of the object-side partial compound lens.

According to some embodiments of the camera lens according to the system described herein, the second compound lens, in particular the image-side partial compound lens of the second compound lens, comprises at least one lens element that is aspheric at least in the optically used region and can be without inflection points in particular at least in the optically used region. If the aspheric lens element is without inflection points at least in the optically used region, it has only one converging, or positive, refractive power or a diverging, or negative, refractive power. Changing the sign of the refractive power for different regions of a beam that passes through the aspheric lens element without inflection points does not occur in an aspheric lens element that has no inflection points at least in the optically used region of the aspheric surfaces. In particular, the aspheric lens element of the second compound lens that has no inflection points can be configured like the aspheric lens element of the third compound lens that has no inflection points such that it is also without inflection points and aspheric outside the optically used region and in particular over the entire respective surface.

According to some embodiments of the camera lens according to the system described herein, the at least one aspheric lens element of the second compound lens is a bi-aspheric lens element, i.e. a lens having aspherically shaped surfaces on both sides. The bi-aspheric lens element has a greater number of degrees of freedom with respect to a simple aspheric lens element and especially with respect to a spherical lens element. Corrections that are normally distributed over a plurality of lens elements can thus be performed by a single lens element. The use of a bi-aspheric lens element with respect to a simple aspheric lens element or even with respect to a spherical lens element in the second compound lens thus results in a noticeably lower mass of the second compound lens and thus in fast internal focusing with focusing times of typically less than or equal to 100 ms. The mass of the lens elements to be moved of the second compound lens is, in some embodiments, at most 30 g, for example, at most 20 g. The associated acceleration forces that occur therefore permit use of commercially available actuator modules with short focusing times.

In some embodiments, the at least one aspheric lens element has angles of inclination of less than or equal to 60° along its aspheric surface or, in the case of a bi-aspheric lens element, along its aspheric surfaces. Such aspheric lens elements can be produced by way of customary production methods for blank pressing (moulding). The at least one aspheric lens element can therefore be formed from a glass having a low transition temperature that is suitable for blank pressing. It is thus possible to use glasses that are known as "low Tg glasses".

According to some embodiments of the camera lens according to the system described herein, the at least one aspheric lens element of the second compound lens comprises at least one aspheric surface having an optical refractive power with a strong progression towards the margin. Here, the refractive power of a beam at the field margin can be increased by at least a factor of 5 and in particular by at least a factor of 10 with respect to the refractive power of a beam in the field centre. This form of the at least one aspheric lens element primarily results from the desire to keep the angles of incidence of the outermost beams on the sensor below a limit value of 26°. This asphere thus serves less for correcting classical imaging errors and more for producing a desired exit pupil position of the lens.

In some embodiments of the camera lens according to the system described herein, the converging refractive power $P_v$ of the first compound lens has at least 0.8 times the total lens reflective power $P_{tot}$ ($P_v \geq 0.8*P_{tot}$), at least 1.4 times the total lens refractive power $P_{tot}$ ($P_v \geq 1.4*P_{tot}$) in some embodiments. The total lens refractive power is here equal to the inverse of the lens focal length.

A strongly converging compound lens in front of the aperture stop and an overall diverging compound lens behind the aperture stop contributes to a short structural length while maintaining the specified focal length.

In the camera lens according to the system described herein, the first compound lens can comprise, along the optical axis, at least one object-side partial compound lens and at least one image-side partial compound lens, wherein the object side partial compound lens has a diverging refractive power, or negative refractive power, and the image-side partial compound lens has a converging, or positive, refractive power. This arrangement of partial compound lenses has the result that the quotient, consisting of the numerator with the distance from the first lens element vertex to the centre of the entrance pupil (the location in the beam path at which the beams that enter the camera lens on the object side overlap to a maximum degree) and the denominator with the structural length of the camera lens, becomes small. When normalizing the numerator to 1, the values of the quotient are smaller than 0.2, smaller than 0.1 in some embodiments. This means that the entrance pupil of the camera lens is located near the first lens element. In this case, the diameter that is necessary to transmit all beams through the lens without vignetting corresponds to the diameter of the entrance pupil itself, and thus to the smallest possible value that is at all possible. If the entrance pupil, by contrast, were located within the system, larger diameters of the first lens element would be required to transmit all field beams without vignetting. If the entrance pupil were located at a distance from the first lens element, the optics attachment would consequently have to be larger and heavier. The entrance pupil being near the front lens element thus has the result that compact optics attachments (wide-angle optics and teleoptics attachments) for the camera lens can be used.

According to some embodiments of the camera lens according to the system described herein, the first compound lens is arranged immovably along the optical axis. The aperture stop that is arranged between the first compound lens and the second compound lens is imaged on the object side by way of the immovable first compound lens. This image represents the entrance pupil, the position of which remains constant with respect to the optical axis at different focusing settings. Since the entrance pupil position remains constant during focusing, an optics attachment that is connected in front thus produces no error components that depend strongly on the focusing setting.

In accordance with some embodiments of the camera lens according to the system described herein, the at least one aspheric lens element of the third compound lens has an angle of inclination of less than or equal to 60° along the aspheric surfaces thereof. The angle of inclination here refers to the angle of the surface tangent of a surface element with respect to the optical axis. By limiting the angle of inclination on the aspheric surfaces to <60°, the aspheric lens element is able to be produced using common manufacturing methods for blank pressing, as has been described with reference to the aspheric lens element of the second compound lens. The at least one aspheric lens element of the third compound lens can consequently be formed in particular from a glass having a low transition temperature that is suitable for blank pressing. It is thus possible to use glasses that are known as "low Tg glasses".

The at least one aspheric lens element of the third compound lens can additionally comprise at least one aspheric surface having an optical refractive power that exhibits a strong progression towards the margin. Here, the refractive power of a beam at the field margin of the at least one aspheric lens element of the third compound lens can be increased by at least a factor of 5, by at least a factor of 10 in some embodiments, with respect to the refractive power of a beam in the field centre. As in the case of the aspheric lens element of the second compound lens, this form of the at least one aspheric lens element primarily results from the desire to keep the angles of incidence of the outermost beams on the sensor below a limit value of 26°.

It is furthermore possible for the at least one aspheric lens element of the third compound lens to be arranged as the image-side last lens element of the camera lens along the beam direction. In a compact camera having an integrated camera lens, this aspheric lens element is typically fixedly installed directly in front of the sensor. When using interchangeable lenses, said aspheric lens element remains a constituent part of the camera lens.

In accordance with some embodiments of the camera lens according to the system described herein, the at least one aspheric lens element of the third compound lens can be a bi-aspheric lens element, and the third compound lens can in particular exclusively consist of the bi-aspheric lens element. Using only one lens element in the third compound lens reduces the mass and the length of the camera lens.

In accordance with some embodiments of the camera lens according to the system described herein, the position of the entrance pupil at the first lens element is given by the condition $x/L \leq 0.2$. Here, x designates the distance from the first lens element vertex to the centre of the entrance pupil, and L designates the structural length of the camera lens. In some embodiments, the quotient x/L is at most 0.2, for example, at most 0.1. This configuration is advantageous in particular with respect to the use of the camera lens together with an optics attachment, as has already been explained further above.

In some embodiments, the camera lens according to the system described herein is designed in particular for use together with optics attachments. Optics attachments are here wide-angle optics or teleoptics attachments. The usability in connection with optics attachments is ensured by way of two features of the camera lens according to the system described herein. Firstly, internal focusing is performed exclusively by way of lens element movements behind the aperture stop, because in that case the entrance pupil position remains constant during focusing and the optics attachment thus produces no error components that depend strongly on the focusing setting. Secondly, the entrance pupil of the main lens is located very close to the first lens element. As a result, the required diameter of the optics attachment can be minimized without the optics attachment causing the imaging beam to be additionally trimmed. The additional trimming is also referred to as vignetting. Additional trimming occurs when the marginal rays which can still be detected by the sensor are blocked by an additional optical unit in front of the camera lens. The system described herein therefore also relates to the use of a camera lens according to the system described herein together with an optics attachment that is connected in front of it.

The system described herein furthermore relates to a still or film camera having a camera lens according to the system described herein. The advantages to be attained by way of the still or film camera according to the system described herein can be derived from the advantages of the camera lens according to the system described herein described above.

BRIEF DESCRIPTION OF THE DRAWINGS

Further features, properties and advantages of the system described herein will become apparent from the following illustrative embodiments with reference to the accompanying figures.

DETAILED DESCRIPTION OF VARIOUS EMBODIMENTS

Figure 1:
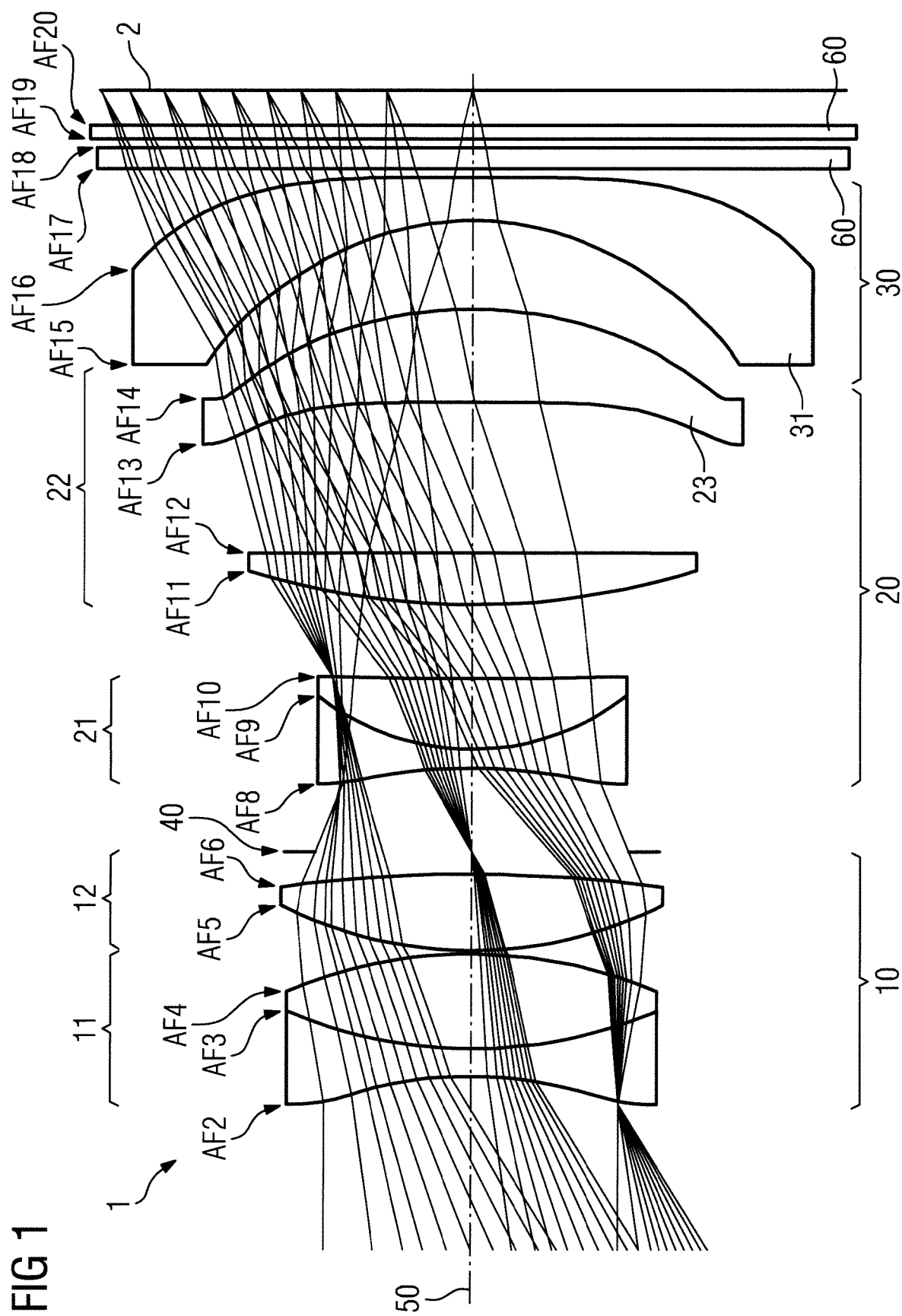
FIG. 1 shows an illustrative example of a camera lens 1 according to the system described herein of a first embodiment having a focusing setting to infinity.

Some embodiments of a compact camera lens 1 with highest image quality for a camera having a full-frame sensor will now be described with reference to the figures.

The system described herein provides a camera lens 1 for a camera 100 having a full-frame sensor 102. The camera 100 having the camera lens 1 and an optional optics attachment 104 is illustrated schematically in FIG. 13. The optional optics attachment 104 can be a wide-angle optics attachment or a teleoptics attachment. The camera lens 1 is highly compact and has the highest image quality. The sensors referred to as full-frame sensors are sensors 102 that have an image circle diameter of 43.2 mm.

Figure 13:
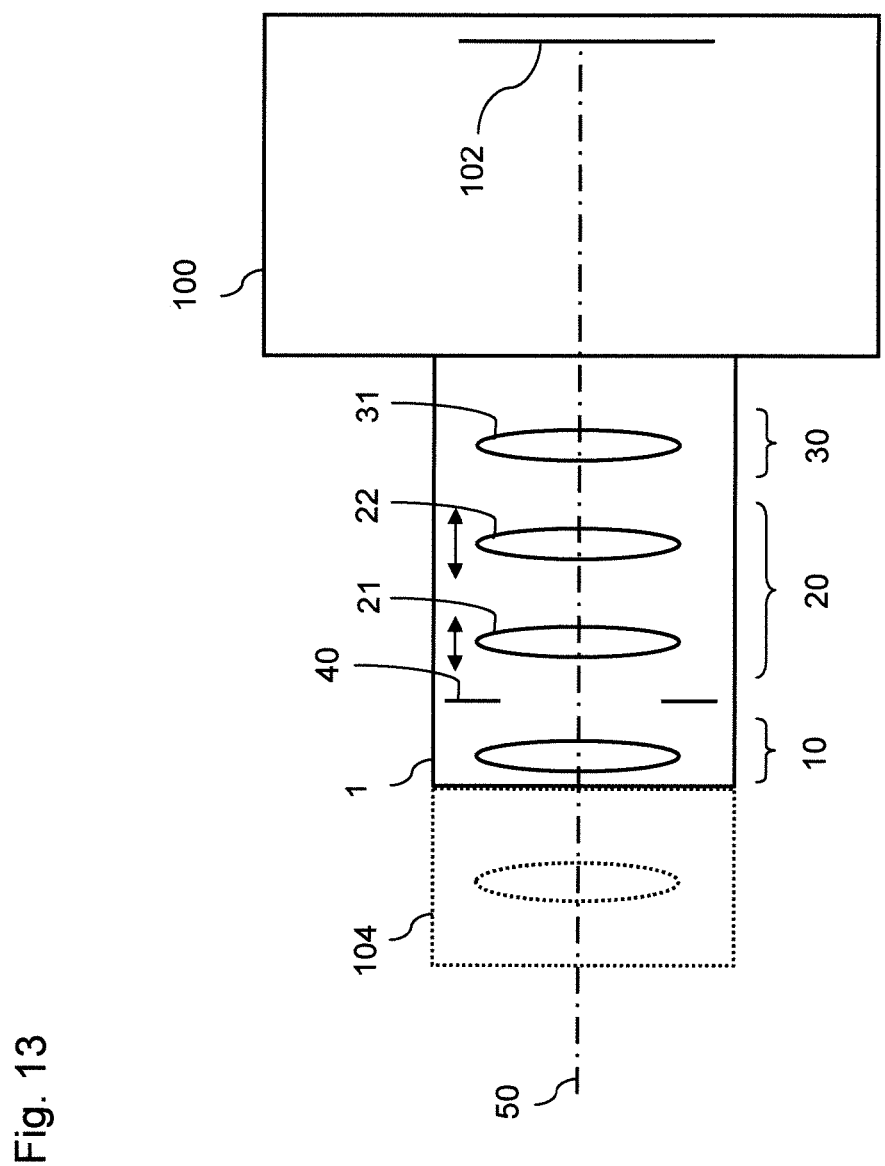
FIG. 13 shows an illustrative example of a schematic illustration of a camera having a lens and an optional lens attachment.

The camera lens 1 may be configured to have three compound lenses 10, 20, 30, of which the first compound lens 10, which leads on the object side, comprises one or more lens elements and has a converging refractive power. The first compound lens 10 is followed, on the image side, by the second compound lens 20. The latter comprises at least two lens elements 21, 22, which are arranged movably along the optical axis 50, as is indicated in FIG. 13 by way of double-headed arrows. The third compound lens 30 follows the second compound lens 20 on the image side and represents the compound lens of the camera lens 1 that terminates on the sensor side. It may be configured to comprise at least one aspheric lens element 31, having a diameter of at least 25 mm, which is fixedly arranged in the longitudinal direction of the optical axis 50. An aperture stop 40 may be arranged between the first compound lens 10 and the second compound lens 20.

A first illustrative embodiment for the camera lens 1 according to the system described herein is shown in FIG. 1. The camera lens 1 in FIG. 1 has a variant with 8 lens elements, which has an f-number of 2.0 and a focal length of 35 mm. The structural length of the camera lens 1 of the first embodiment is a mere 57 mm, measured along the vertex points of the lens elements on the optical axis 50 from the first lens element to the image sensor. The 57 mm measured here for a camera lens 1 of a camera having a full-frame sensor are extremely compact as compared to camera lenses for cameras having full-frame sensors and similar image quality. The camera lens 1 according to the system described herein of the first embodiment can meet the requirement described above that the structural length is limited to less than or equal to 1.5 times the image circle diameter. Since the image circle diameter is 43.2 mm, a particularly compact camera lens 1 should not exceed a structural length of 64.8 mm. The camera lens 1 according to the system described herein of the first embodiment has a structural length of 57.00 mm.

The camera lens 1 shown in illustrative example of FIG. 1 has eight lens elements. Said eight lens elements are divided into three compound lenses 10, 20, 30. The first compound lens 10 has three lens elements, while the second compound lens 20 has four lens elements and the third compound lens 30 only has one lens element. An aperture stop 40 is arranged between the first compound lens 10 and the second compound lens 20. Both the first compound lens 10 and the single lens element of the third compound lens 30 are arranged immovably with respect to the optical axis 50. The second compound lens 20, on the other hand, is arranged movably with respect to the optical axis 50.

The first compound lens 10, consisting of three lens elements, is subdivided into two partial compound lenses, referred to as the image-side partial compound lens 12 and the object-side partial compound lens 11. The object-side partial compound lens 11 comprises two lens elements, specifically an object-side biconcave lens element and an image-side biconvex lens element. Both lens elements are cemented together. The two cemented lens elements of the object side partial compound lens 11 of the first compound lens 10 have a diverging, or negative, total refractive power.

The image-side partial compound lens 12 of the first compound lens 10 comprises only a single converging lens in the first embodiment. Said single converting lens is a biconcave lens element, wherein the image-side radius of curvature is several times greater than the object-side radius of curvature.

The first compound lens 10 images the aperture stop 40 on the object side. The refractive power of the first compound lens is here 1.415 times the total refractive power of the camera lens. Due to the fact that the first compound lens 10 is arranged immovably with respect to the optical axis 50, the object-side imaging of the aperture stop 40, which is referred to as the entrance pupil, is constant with respect to the optical axis 50 in terms of position and size. When using an optics attachment, image aberrations that vary with object distance are hereby avoided. If the entrance pupil position were to vary, focusing-setting-dependent image aberrations of the optics attachment would occur; in this context, reference is also made to "imaging errors induced" by the entrance pupil position, because by varying the entrance pupil position, the pathway of the beam paths that contribute to the image varies due to the optics attachment. It would not be possible to compensate said image aberrations because no movable optical elements are provided in the optics attachment.

The entrance pupil of the camera lens 1 is located on the object side near the object-side biconcave lens element of the object-side partial compound lens 11 of the first compound lens 10. The required diameter of an optics attachment can thus be minimized without the imaging beams being additionally trimmed by the optics attachment, referred to as vignetting.

In this illustrative embodiment, the aperture stop 40 is fixedly arranged with respect to the optical axis 50, with the result that no change in position and size of the entrance pupil is caused by the aperture stop 40 either.

In this embodiment, the second compound lens 20 has, as already mentioned, four lens elements. Said second compound lens 20 in turn can be divided into two partial compound lenses, specifically an object-side partial compound lens 21 and an image-side partial compound lens 22. The object-side partial compound lens 21 comprises two lens elements. The object-side lens element of the two lens elements is a biconcave lens element, while the image-side lens element of the two lens elements is a concave-convex lens element, aka a meniscus lens element. In the first embodiment, the concave-convex lens element is a positive meniscus lens element. The side having the smaller radius of curvature of the positive meniscus lens element faces the object. The biconcave lens element and the positive meniscus lens element are cemented together. The total refractive power of the two cemented lens elements is negative, or diverging.

The image-side partial compound lens 22 of the second compound lens 20 also comprises two lens elements. The object-side lens element of the partial compound lens 22 is a biconvex lens element, the stronger curvature of which faces in the direction of the object. The image-side lens element of said partial compound lens 22 is, again, a positive meniscus lens element. Both lens elements of the image-side partial compound lens 22 have a relatively large distance between them and are not cemented together. During focusing, the distance between the two lens elements is kept constant. The total refractive power of the image-side partial compound lens is positive, or converging.

The third compound lens 30 comprises only a single lens element in the first embodiment. Said single concave-convex lens element is a special negative meniscus lens element. The negative meniscus lens element additionally has a flat area on the convex side, and its flattened convex side faces the sensor. In this embodiment, the single meniscus lens element can be installed fixedly in front of the sensor so far as the lens is not an interchangeable lens. It serves for setting the exit pupil position desired at the sensor 2.

The total refractive power of the second and the third compound lens, i.e. of all lens elements after the aperture stop, is −1.055 times the total refractive power of the camera lens.

In the first embodiment, two bi-aspheric lens elements 23, 31 are used. A bi-aspheric lens element 23 is used in the image-side partial compound lens 22 of the second compound lens 20. The image-side lens element 23 of this compound lens 22 is a bi-aspheric lens element 23 in the form of the previously mentioned positive meniscus lens element 23. A further bi-aspheric lens element 31 is used in the third compound lens 30. This single lens element 31 is a bi-aspheric lens element 31 in the form of a negative meniscus lens element 31.

The two aspheric lens elements 23, 31 in the present embodiment have, on their aspheric surfaces AF13, AF 14, AF15 and AF16, shapes that have no inflection points at least in the optically used region of the surfaces, but in particular on the entire surface. The angles of incidence of the aspheric surfaces are <60° everywhere on each surface. The aspheric lens elements 23, 31 can thus be produced by way of customary production methods for blank pressing. Said blank pressing is also referred to as "moulding". Furthermore, the aspheric lens elements 23, 31 are formed from a glass having a low transition temperature suitable for blank pressing. "Low Tg glasses" are used here for said aspheric lens elements 23, 31.

Furthermore, the surfaces AF13 and AF16 of the aspheric lens elements 23, 31 each have an optical refractive power with a strong progression towards the margin. The refractive power of the respective asphere surface having a strong progression towards the margin of the aspheric lens elements 23, 31 for the optical beam at the field margin is at least 5 times, 10 times in some embodiments, greater than for a beam in the centre of the field.

Figure 2:
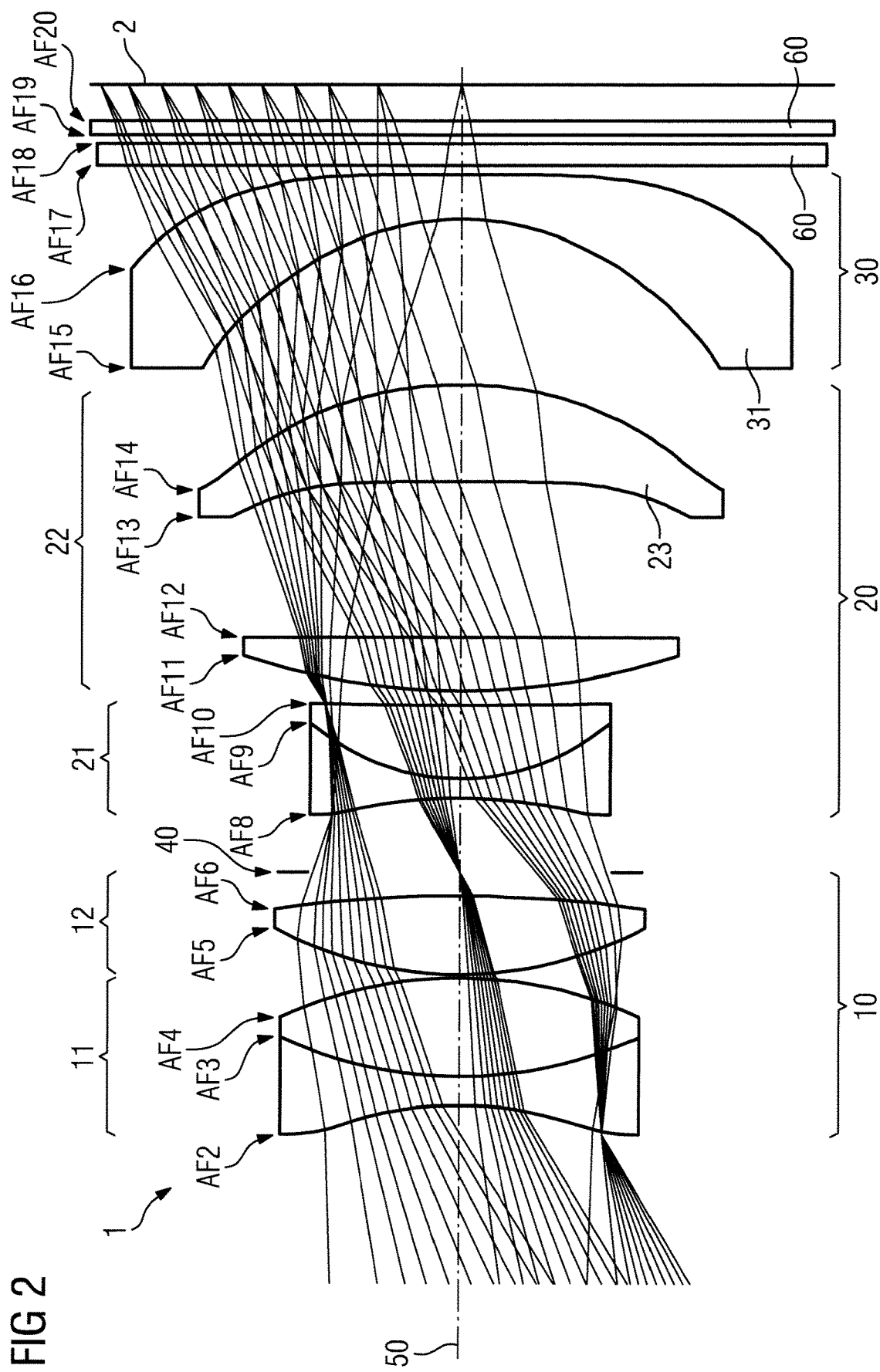
FIG. 2 shows an illustrative example of the camera lens 1 according to the system described herein of the first embodiment having a focusing setting to a near setting limit of 30 cm.

FIG. 2 illustrates the same camera lens 1 of the first embodiment. In FIG. 1, the camera lens 1 is focused to infinity, while the camera lens 1 in FIG. 2 is set to a near setting limit of 30 cm. The near setting limit is given as the distance between the object and the sensor. Due to the fact that the first compound lens 10 and the third compound lens 30 and also the aperture stop 40 are arranged immovably with respect to the optical axis 50, a difference can be seen in the camera lens 1 only in terms of the second compound lens 20. Both the object-side partial compound lens 21 and the image-side partial compound lens 22 of the second compound lens 20 were moved in the direction of the object. The respective displacement path of the two partial compound lenses 21, 22, however, differs. In the present embodiment, the displacement path of the image-side partial compound lens 22 is greater than the displacement path of the object-side partial compound lens 21. When focusing the camera lens 1 to the near setting limit of 30 cm, both partial compound lenses 21, 22 are closer together than when focusing to infinity.

The arrangement of the object-side partial compound lens 21 and the image-side partial compound lens 22 of the second compound lens 20 permits fast focusing. Focusing times of less than 100 ms are achieved in this case. The camera lens 1 thus has fast internal focusing over a large object distance range. In addition, high image quality is retained in the near setting range. The total mass of the lens elements to be moved in the present embodiment has a maximum weight of 20 g to 30 g.

In addition, FIG. 1 and FIG. 2 show two filters 60 between the camera lens 1 and the sensor 2. Said filters 60 are not part of the camera lens 1, but are taken into consideration with respect to thickness and refractive index in the design of the lens.

Figure 3:
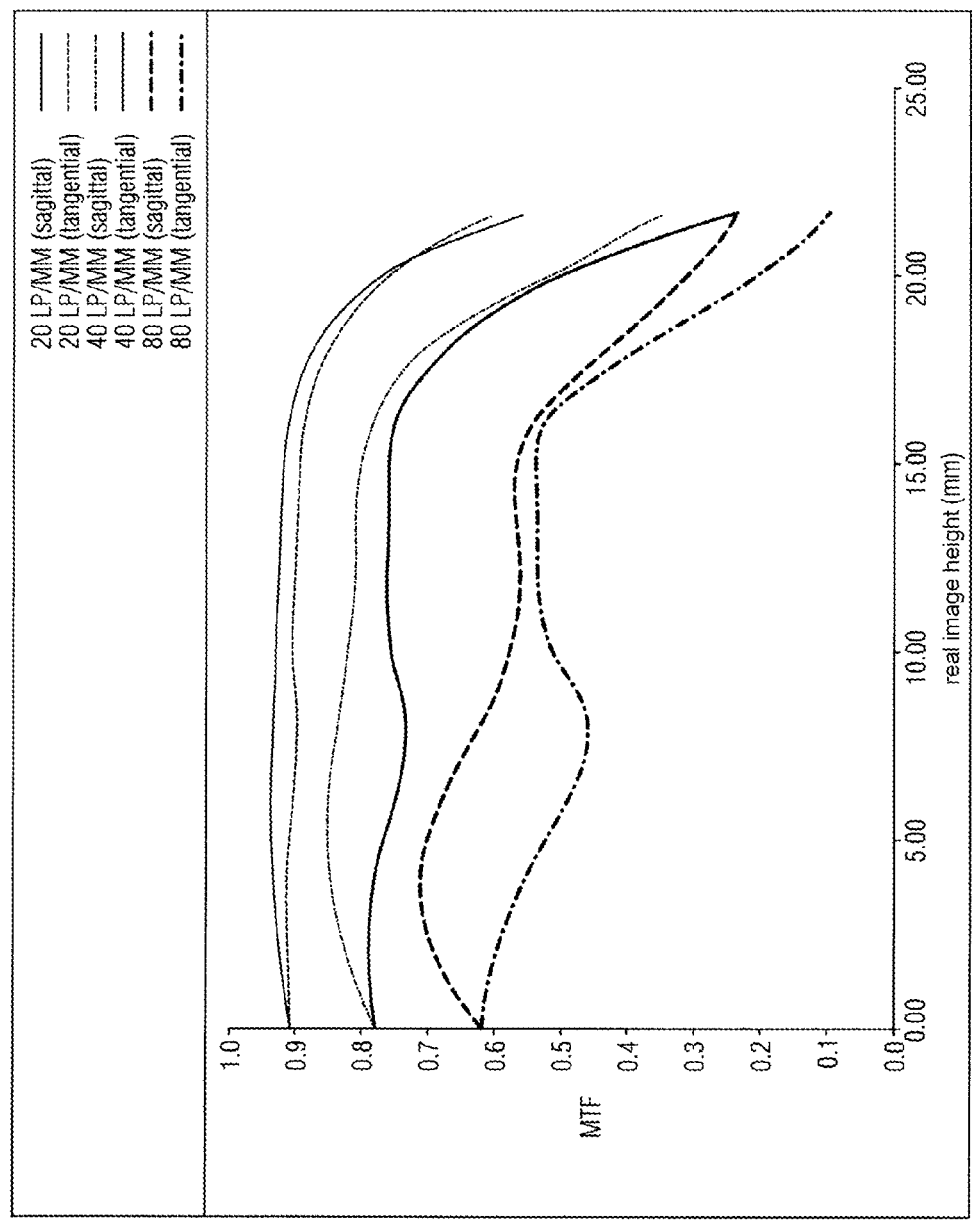
FIG. 3 shows an illustrative example of the modulation transfer function in dependence on the image height for the camera lens 1 of the first embodiment.

FIG. 3 illustrates a diagram that plots the modulation transfer function (MTF) over the image height. This diagram of FIG. 3 illustrates three curve pairs of the modulation transfer function that are dependent on the parameter "line pairs per millimetre". The parameter "line pairs per millimetre" is kept constant for a specific value for each curve pair. The first curve pair plots the modulation transfer function for 20 line pairs per millimetre, the second curve pair plots the modulation transfer function at 40 line pairs per millimetre, while the third curve pair plots the modulation transfer function at 80 line pairs per millimetre. Each individual curve pair consists of two further curves. The first of the two curves shows the sagittal component of the incident light, while the second curve shows the tangential component of the incident light.

The MTF curves show that, up to an image height of 12 mm (vertical frame edge) or even 18 mm (horizontal frame edge) at 80 line pairs per millimetre and thus at all lower spatial frequencies, in each case a high contrast of typically at least 50% is present, which drops only towards the outermost image corner (image heights>18 mm). Only the tangential component has a slightly lower value in the region between approximately 5 mm image height and 10 mm image height. Such a contrast drop is acceptable in practice, because image heights beyond 18 mm represent only an extremely small part of the sensor surface, specifically only the outermost image corners.

The curve pair with 20 line pairs per millimetre has a contrast of approximately 90% in the region of the image height between 0 mm and approximately 16 mm. The sagittal and tangential components of the incident light differ only minimally.

A somewhat greater separation of the sagittal component and the tangential component can be found in the curve pair with 40 line pairs per millimetre. Here, the sagittal component has a contrast of a little over 80%, and the tangential component has a contrast of a little under 80%. This applies in particular to the image height between 0 mm and 11 mm. Both components have a similar contrast between 11 mm and 16 mm image height. Here, the curves are very close to the 80% line.

Although the difference in contrast in the case of the curve pair at 80 line pairs per millimetre in the region between 0 mm and 10 mm of image height is greatest with respect to the other curve pairs, the contrast of the sagittal and the tangential components between 11 mm and 16 mm image height is almost identical. Both curves here have a contrast of approximately 55%.

As a result of the foregoing, the camera lens 1 can meet the requirement described above that the image quality be at an extraordinarily high level with full lens opening at an aperture stop 40 of 2.0. When stopping down the camera lens 1 or the aperture stop 40 to 4.0, the contrast increases further, with the result that the camera lens 1 in that case images in a virtually diffraction-limited manner.

Figure 4:
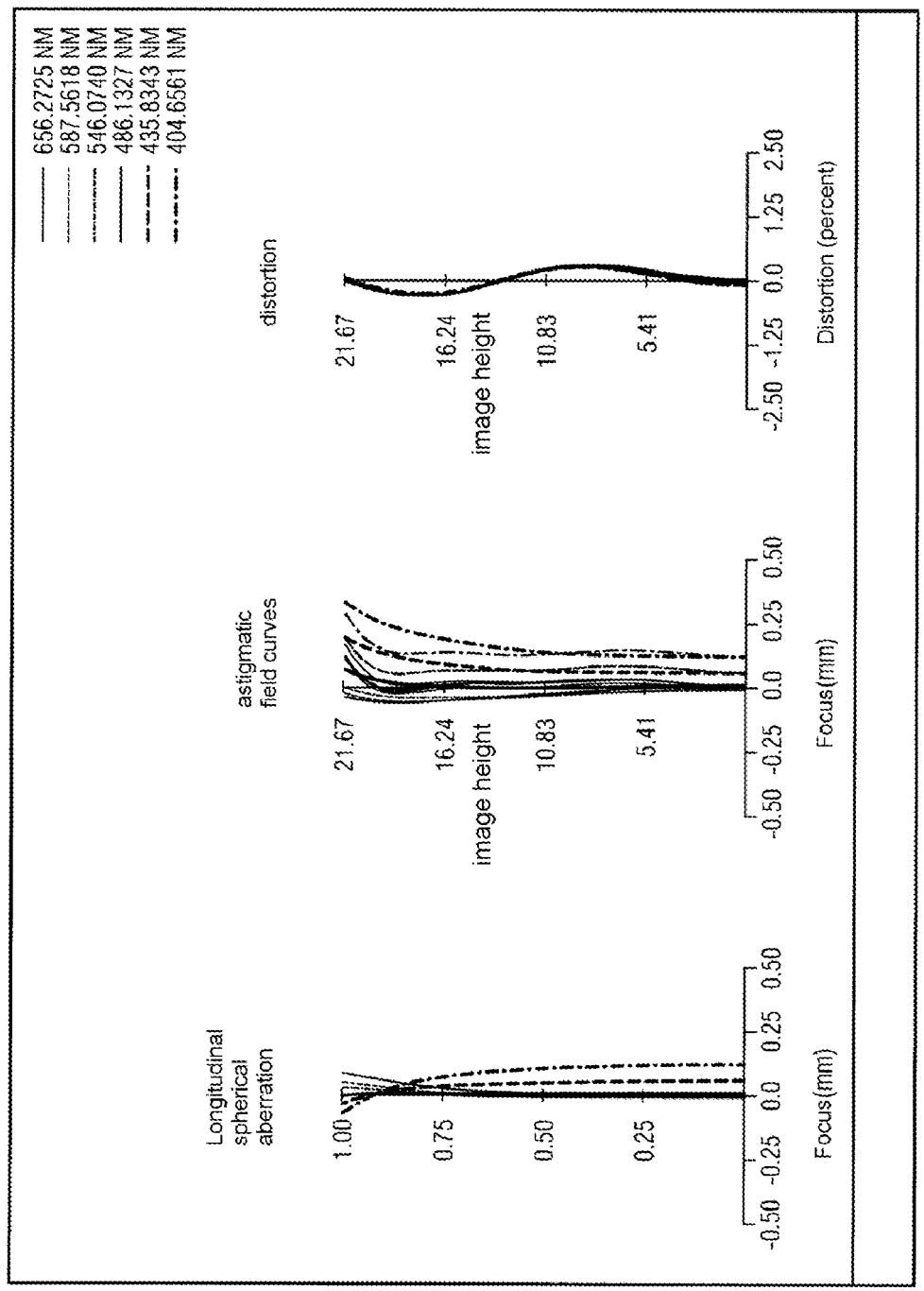
FIG. 4 shows an illustrative example of the spherical aberration, the astigmatism and the distortion for the camera lens 1 of the first embodiment.

FIG. 4 shows the typical image aberration representations. The spherical aberration is illustrated in the left-hand diagram in FIG. 4. For the purposes of describing the spherical aberration, the height of incidence is given as a function of the back focal length difference or the focus. In this diagram, the spherical aberration was represented for different wavelengths of visible light. In this case, the range of visible light from 404.6561 nm to 656.2725 nm suffices. A person skilled in the art can see the good correction of the spherical aberration in the left-hand diagram of FIG. 4. Except for the region of the smaller wavelengths, the spherical aberration has been corrected extraordinarily well.

The aberration astigmatism is illustrated in the central diagram in FIG. 4. For the purposes of describing the astigmatism, the image height is plotted as a function of the back focal length difference or the focus. It can be seen that the astigmatism has been corrected extraordinarily well for larger wavelengths of visible light. The astigmatism is more pronounced only for smaller wavelengths of visible light. The used range of the wavelengths in the visible light is identical to those in the left-hand diagram.

The diagram on the right in FIG. 4 plots the profile of the distortion over the image height. Good correction of the distortion can be seen in this diagram. The wavelength-dependent change in distortion corresponds to the chromatic difference of magnification CDM, which is often referred to as the "lateral chromatic aberration". What can therefore also be seen is that, in addition to the extremely low distortion of less than 0.5% (for every wavelength), the lens only has an extremely low CDM. A greater CDM would become noticeable in the image by way of disturbing colour fringes at high-contrast edges. The used range of the wavelengths in the visible light is identical to those in the left-hand diagram.

Figure 5:
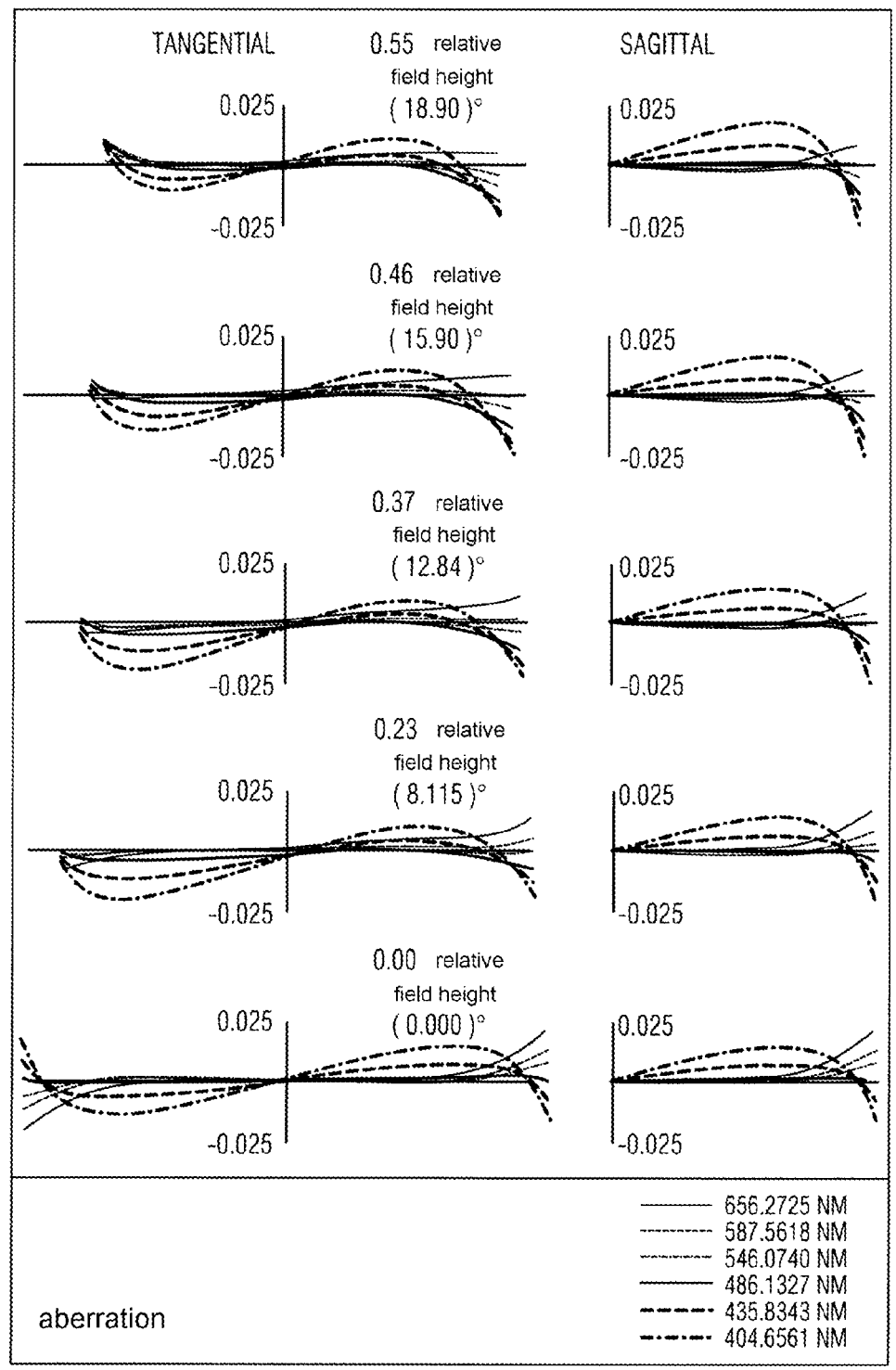
FIGS. 5 and 6 show an illustrative example of lateral chromatic aberration diagrams for the camera lens 1 of the first embodiment.
Figure 6:
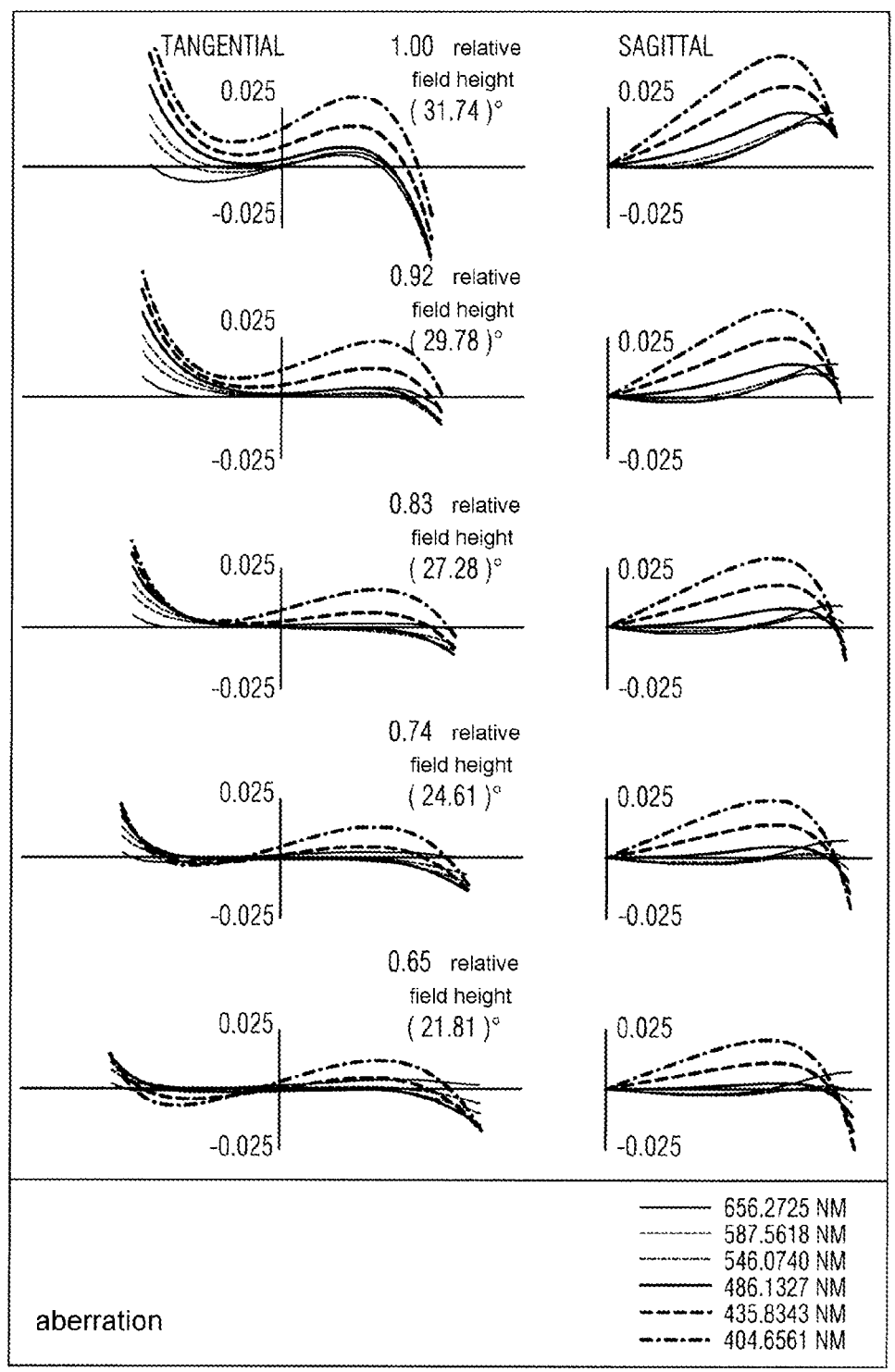

The associated depictions of the typical lateral chromatic aberration diagrams are illustrated in FIGS. 5 and 6. The diagrams in FIGS. 5 and 6 show the tangential and the sagittal components of the incident light. The wavelength used here is in the range between 404.6561 nm and 656.2725 nm. A person skilled in the art of optics can read herefrom the profile of the image aberrations over the aperture and the field. FIGS. 5 and 6 show in particular the extremely good correction of the chromatic image aberrations.

Table 1 below lists the basic construction data pertaining to the lens. The surfaces of the lens elements AF2 to AF20 are shown in FIGS. 1 and 2.

TABLE 1

| Surface | Surface type | Vertex radius of the surface curvature | Distance from the following surface (air gap or lens element thickness) | Trade name with manufacturer information | Semidiameter of the optically used surface |
|---|---|---|---|---|---|
| Object | spherical | infinite | infinite | | |
| AF1 | spherical | infinite | 10.00000 | | 13.81912 |
| AF2 | spherical | −23.31930 | 1.60000 | STIH6_OHARA | 8.55000 |
| AF3 | spherical | 27.53319 | 5.50000 | SLAM61_OHARA | 9.38782 |
| AF4 | spherical | −27.53319 | 0.20000 | | 9.80123 |
| AF5 | spherical | 24.92030 | 4.40000 | SNPH1_OHARA | 10.12667 |
| AF6 | spherical | −81.82505 | 1.30000 | | 9.87401 |
| Aperture 40 | spherical | infinite | 4.80480 | | 9.10000 |
| AF8 | spherical | −32.17761 | 1.10000 | STIH1_OHARA | 7.65000 |
| AF9 | spherical | 14.49702 | 4.10000 | SFPM2_OHARA | 7.88802 |
| AF10 | spherical | 370.02251 | 4.26298 | | 8.10000 |

TABLE 1-continued

| Surface | Surface type | Vertex radius of the surface curvature | Distance from the following surface (air gap or lens element thickness) | Trade name with manufacturer information | Semidiameter of the optically used surface |
|---|---|---|---|---|---|
| AF11 | spherical | 44.10411 | 3.00000 | SLAH59_OHARA | 11.73325 |
| AF12 | spherical | −1857.77292 | 8.71275 | | 11.94034 |
| AF13 | aspheric | infinite | 5.40000 | SFPM2_OHARA | 13.80054 |
| AF14 | aspheric | −24.95694 | 5.11947 | | 14.53752 |
| AF15 | aspheric | −17.01007 | 2.50000 | LLAM69_OHARA | 14.96886 |
| AF16 | aspheric | infinite | 0.50000 | | 18.47620 |
| AF17 | spherical | infinite | 1.20000 | BK7_Schott | 20.17427 |
| AF18 | spherical | infinite | 0.50000 | | 20.46500 |
| AF19 | spherical | infinite | 0.80000 | BK7_Schott | 20.66304 |
| AF20 | spherical | infinite | 2.00000 | | 20.86325 |
| Image | spherical | infinite | 0.00000 | | 21.67233 |

The rows show, from top to bottom, the surface numbers of the lens elements corresponding to FIG. 1 or 2. The columns show, from left to right, the surface type (spherical or aspheric), the vertex radius of the surface curvature, the distance from the following surface (the air gap or the lens element thickness), the trade name of the optical glass used with manufacturer information, and the semi-diameter of the optically used surface.

The focal length of the optical unit is exactly 35.00 mm at an object distance equal to infinity. During focusing to other object distances, the air gaps between the surfaces AF7, AF10 and AF14 change in accordance with table 2 (interpolation should be carried out accordingly between the explicitly stated distances). The surface 0 in the following table is the plane of the object.

TABLE 2

| | Setting Z1 | Setting Z2 | Setting Z3 | Setting Z4 |
|---|---|---|---|---|
| 0 | infinite | 933 | 433 | 233 |
| AF7 | 4.80480 | 4.68058 | 4.49618 | 4.12952 |
| AF10 | 4.26298 | 3.30344 | 2.27983 | 0.80000 |
| AF14 | 5.11947 | 6.20323 | 7.41125 | 9.25773 |

The four tables 3, 4, 5, 6 give the coefficients of the aspheric surfaces in accordance with the definition equation of the vertex form. Table 3 here shows the asphere coefficients of the surface AF13, table 4 shows the asphere coefficients of the surface AF14, table 5 shows the asphere coefficients of the surface AF15, and table 6 shows the asphere coefficients of the surface AF16 of the first embodiment.

The vertex form is described by the equation:

$$z := \frac{r^2/R}{1 + \sqrt{1-(1+k)*\frac{r^2}{R^2}}} + Ar^4 + Br^6 + Cr^8 + Dr^{10} + Er^{12} + Fr^{14} + Gr^{16} + Hr^{18} + Jr^{20}$$

wherein z is the sag, R the vertex radius of curvature of the lens elements, r the radial distance with $r = \sqrt{x^2+y^2}$, k is the constant of the conic section and A, B, C, D, E, F, G, H, J are the deformation coefficients of the respective order. In spherical lenses, A=B=C=D=E=F=G=H=J=0 and k=0.

TABLE 3

| Parameter | Value |
|---|---|
| Vertex radius | infinite |
| "Conic" constant | 0.00 |
| 4th order - coefficient A | −4.8992092861e−05 |
| 6th order - coefficient B | 6.1949699715e−10 |
| 8th order - coefficient C | −1.2500220906e−09 |
| 10th order - coefficient D | 5.6567321954e−12 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

TABLE 4

| Parameter | Value |
|---|---|
| Vertex radius | −2.4956943999e+01 |
| "Conic" constant | 0.00 |
| 4th order - coefficient A | −1.0662530350e−05 |
| 6th order - coefficient B | −9.6382651819e−09 |
| 8th order - coefficient C | −6.8821065476e−10 |
| 10th order - coefficient D | 3.3476497962e−12 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

TABLE 5

| Parameter | Value |
|---|---|
| Vertex radius | −1.7010065377e+01 |
| "Conic" constant | 0.00 |
| 4th order - coefficient A | 1.0710823842e−05 |
| 6th order - coefficient B | 3.2153423282e−08 |
| 8th order - coefficient C | 3.3940082833e−10 |
| 10th order - coefficient D | −7.0524303110e−13 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

TABLE 6

| Parameter | Value |
|---|---|
| Vertex radius | infinite |
| "Conic" constant | 0.00 |

TABLE 6-continued

| Parameter | Value |
| --- | --- |
| 4th order - coefficient A | −3.5706165113e−05 |
| 6th order - coefficient B | −9.4676861855e−09 |
| 8th order - coefficient C | 1.2368357029e−10 |
| 10th order - coefficient D | −2.3643105236e−13 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

Figure 7:
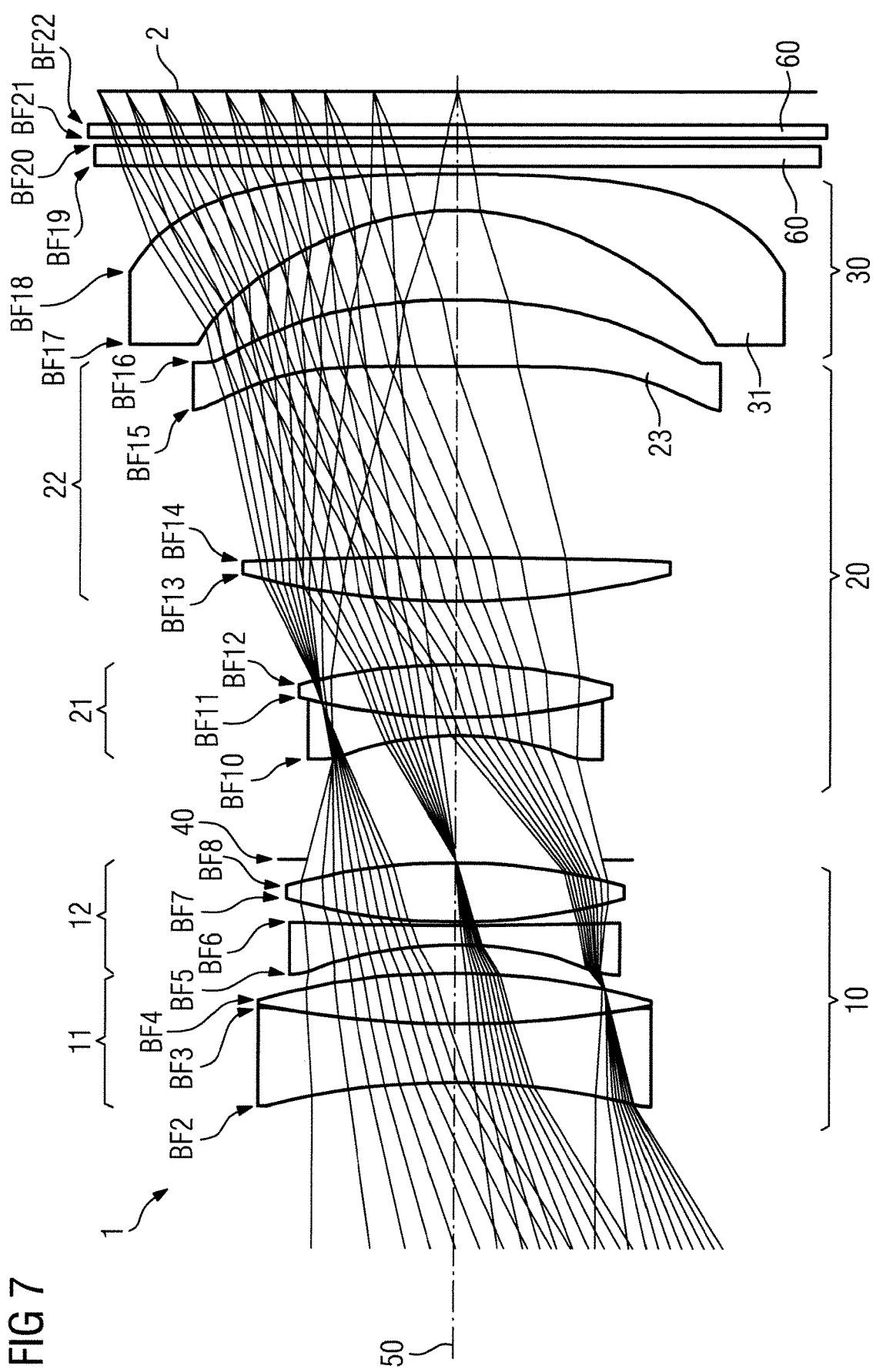
FIG. 7 shows an illustrative example of a camera lens 1 according to the system described herein of a second illustrative embodiment in the position of focusing to infinity.

FIG. 7 shows a second illustrative embodiment for the camera lens 1 according to the system described herein. The second embodiment shows a variant having 9 lens elements, which likewise has an f-number of 2.0 and a focal length of 35 mm. The definitions, designations and images are analogous to the first embodiment. The construction having 9 lens elements has a slightly larger structural length of 60 cm with respect to the construction of the first embodiment. As a result, the second embodiment also can meet the condition, as described above, for a compact camera lens 1 for a camera having a full-frame sensor, that the structural length is limited to less than or equal to 1.5 times the image circle diameter. The camera lens 1 of the second embodiment has a different refractive power distribution in the front objective group than in the first embodiment. This could make possible lower tolerance-induced image quality degradation.

The camera lens 1 of the second embodiment may be configured to comprise nine lens elements, which are divided into three compound lenses 10, 20, 30. The first compound lens 10 in the second embodiment may be configured to comprise four lens elements. Said compound lens is divided, as in the first embodiment, into two partial compound lenses 11, 12. The object-side partial compound lens 11 comprises two lens elements. The object-side lens element of the two lens elements is a biconcave lens element, while the image-side lens element of the two lens elements is a biconvex lens element. Both lens elements are cemented together and have a negative, or diverging, refractive power. The image-side partial compound lens 12 of the first compound lens 10 also comprises two lens elements. The object-side lens element of the two lens elements is a biconcave lens element. The optical surface of the biconcave lens element having the smaller radius of curvature faces the object. The image-side lens element of the two lens elements is a biconvex lens element. The two lens elements of the image-side partial compound lens 12 are not cemented together, the surfaces of the two lens elements that would be necessary for cementing have different radii of curvature. The refractive power of the first compound lens is 0.896 times the total refractive power of the camera lens.

As in the first embodiment, the second compound lens 20 in the second embodiment may be configured to have four lens elements. Said four lens elements are in turn divided into two partial compound lenses 21, 22. The object-side partial compound lens 21 in the second embodiment comprises two lens elements. The object-side lens element of the two lens elements is a biconcave lens element, while the image-side lens element of the two lens elements is a biconvex lens element. Both lens elements are cemented together and have a negative, or diverging, total refractive power.

The image-side partial compound lens 22 of the second compound lens 20 also comprises two lens elements. The object-side lens element of the two lens elements is a biconvex lens element, wherein the optical surface having the smaller radius of curvature faces the object. The image-side lens element of the two lens elements is a positive meniscus lens element, whose concave optical surface faces the object. The two lens elements of the image-side partial compound lens 22 of the second compound lens 20 have a finite distance. During the movement of the lens elements while the camera lens 1 is focusing, this distance remains constant.

The third compound lens 30 comprises, as in the first embodiment, a single negative meniscus lens element. The concave optical surface of the negative meniscus lens element faces the object. In this embodiment, the single meniscus lens element can also be installed fixedly in front of a sensor 2 so far as the lens is not an interchangeable lens. It serves for setting the exit pupil position desired at the sensor 2.

The total refractive power of the second and the third compound lens is −0.176 times the total refractive power of the camera lens.

The lens elements of the first compound lens 10 and the single lens element of the third compound lens 30 are arranged immovably with respect to the optical axis 50. Furthermore, an aperture stop 40 is arranged between the first compound lens 10 and the second compound lens 20. This aperture stop 40 is also arranged immovably with respect to the optical axis 50.

As in the first embodiment, two bi-aspheric lens elements 23, 31 BF 15, BF16, BF17, BF18 are also used in the second embodiment. A bi-aspheric lens element 23 is here used in the image-side partial compound lens 22 of the second compound lens 20, and the other bi-aspheric lens element 31 is used in the third compound lens 30.

The two aspheric lens elements 23, 31 in the present embodiment have, on their aspheric surfaces, shapes that have no inflection points at least in the optically used region of the surfaces, but in particular on the entire surface. The angles of incidence of the asphere surfaces are <60° everywhere on each surface. The aspheric lens elements 23, 31 can thus be produced by way of customary production methods for blank pressing. Furthermore, the aspheric lens elements 23, 31 are formed from a glass having a low transition temperature suitable for blank pressing. "Low Tg glasses" are used here for said aspheric lens elements 23, 31.

Furthermore, the bi-aspheric lens elements 23, 31 in the present embodiment in each case have a surface BF15 and BF18, which exhibits an optical refractive power with a strong progression towards the margin. The refractive power of the asphere surfaces having a strong progression towards the margin of the aspheric lens elements 23, 31 used for the optical beam at the field margin is 5 times greater than for a beam in the centre of the field.

Figure 8:
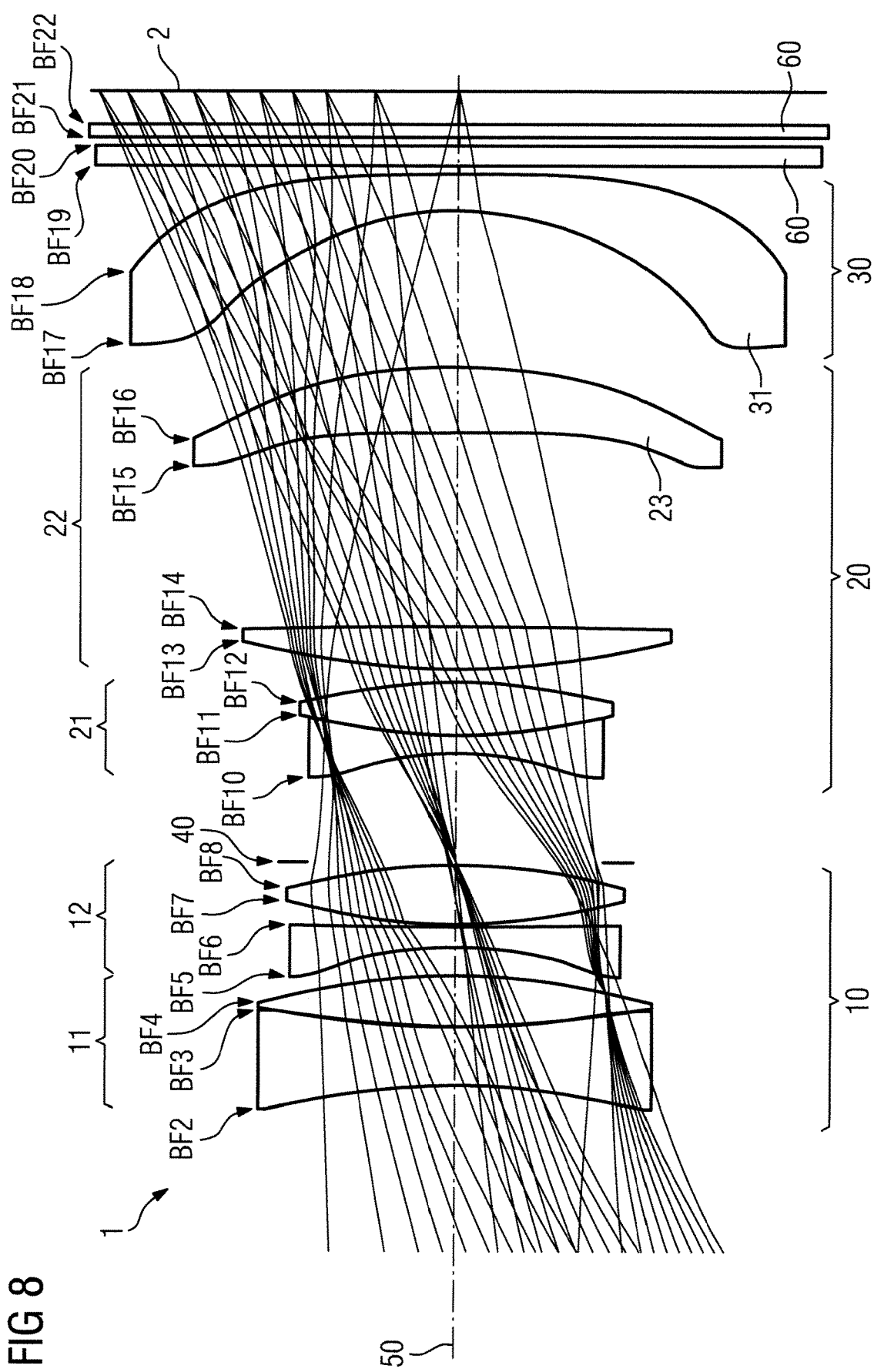
FIG. 8 shows an illustrative example of the camera lens 1 according to the system described herein of the second embodiment having a focusing to the near setting limit of 23 cm.

FIG. 8 illustrates the same camera lens 1 of the second embodiment as in FIG. 7. In FIG. 7, the camera lens 1 is focused to infinity, while the camera lens 1 in FIG. 8 is set to a focus of 30 cm.

In FIG. 8, only the second compound lens 20 has been moved as compared to FIG. 7. Exactly as in the first embodiment, the displacement paths of the two partial compound lenses 21, 22 of the second compound lens 20 differ in magnitude. The displacement path of the image-side partial compound lens 22 is greater than the displacement path of the object-side partial compound lens 21. During focusing from infinity to 23 cm, both partial compound lenses 21, 22 move in the same direction. As in the first embodiment, the two partial compound lenses 21, 22 are located closer together during focusing of the camera lens 1 to 30 cm than during focusing to infinity.

In addition, FIG. 7 and FIG. 8 show two filters 60 between the camera lens 1 and the sensor 2. However, said filters 60 are not part of the camera lens 1.

Figure 9:
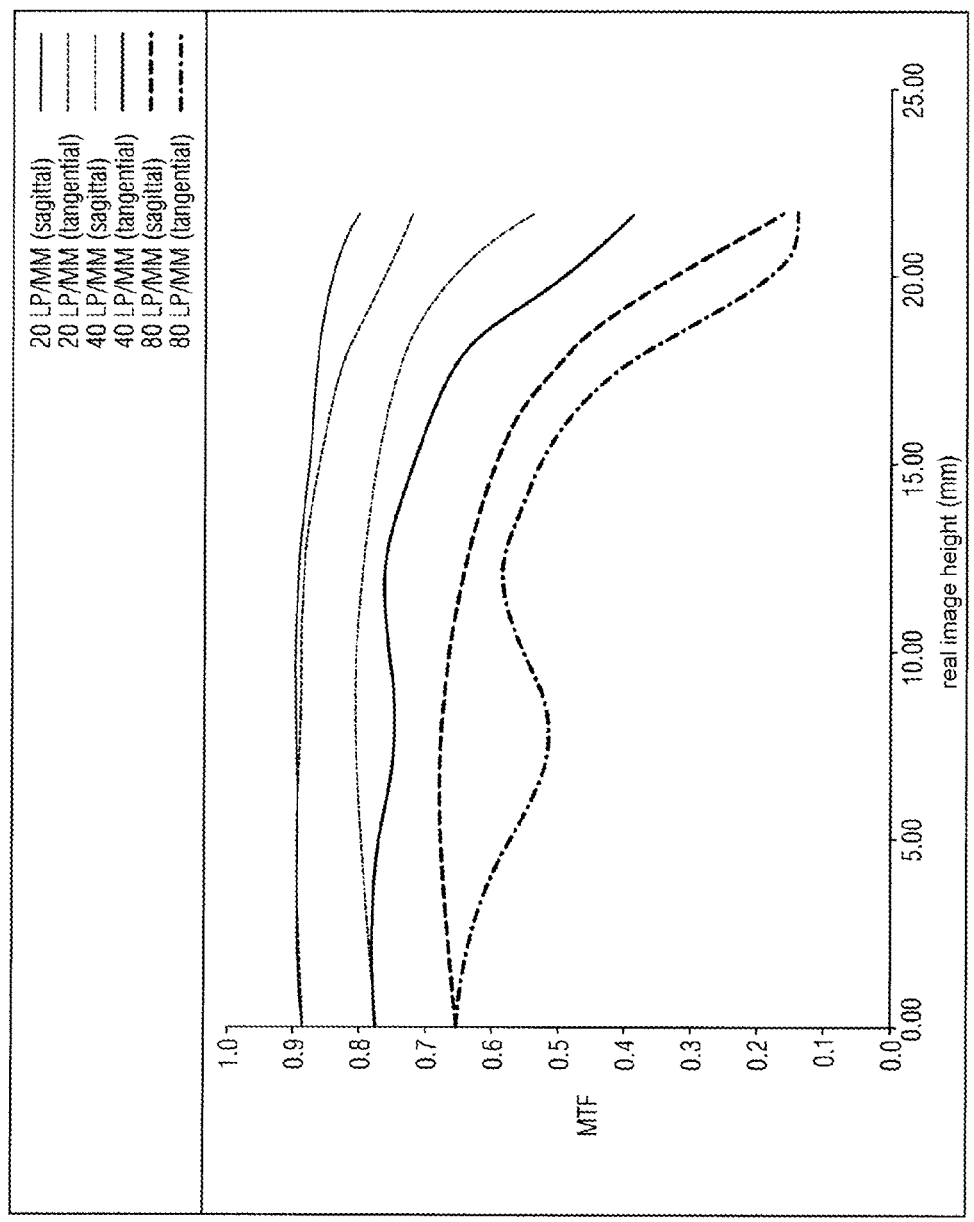
FIG. 9 shows an illustrative example of the modulation transfer function of the camera lens 1 of the second embodiment in dependence on the image height.

FIG. 9 shows the modulation transfer function over the image height for the second embodiment. Once again, this diagram shows three curve pairs for a different number of "line pairs per millimetre". The first curve pair shows the dependency of the modulation transfer function at 20 line pairs per millimetre. The second curve pair shows the dependency of the modulation transfer function at 40 line pairs per millimetre. The third curve pair shows the dependency of the modulation transfer function at 80 line pairs per millimetre. As in FIG. 3, one curve of the curve pair shows the sagittal component of the incident light and the second curve shows the tangential component of the incident light. The drop in the individual curves at greater image height is less pronounced in the second embodiment than in the first embodiment.

The curve pair at 20 line pairs per millimetre in particular has a constant value of 90% in the region of the image height between 0 mm and 15 mm. The sagittal and the tangential components here have almost the same value.

In the other curve pairs with 40 line pairs per millimetre and 80 line pairs per millimetre, the sagittal component always shows a higher contrast. The values among the sagittal and the tangential components are mostly similar.

The curve pair with 20 line pairs per millimetre shows a contrast of approximately 90%. The curve pair with 40 line pairs per millimetre shows an average contrast of 77% in the region of the image height between 0 mm and 15 mm. The curve pair with 80 line pairs per millimetre has at least a contrast of 50% in the region of the image height between 0 mm and 16 mm.

As a result, the camera lens 1 can meet the requirement described above that the image quality be at an extraordinarily high level with full lens opening at an aperture stop 40 of 2.0.

Figure 10:
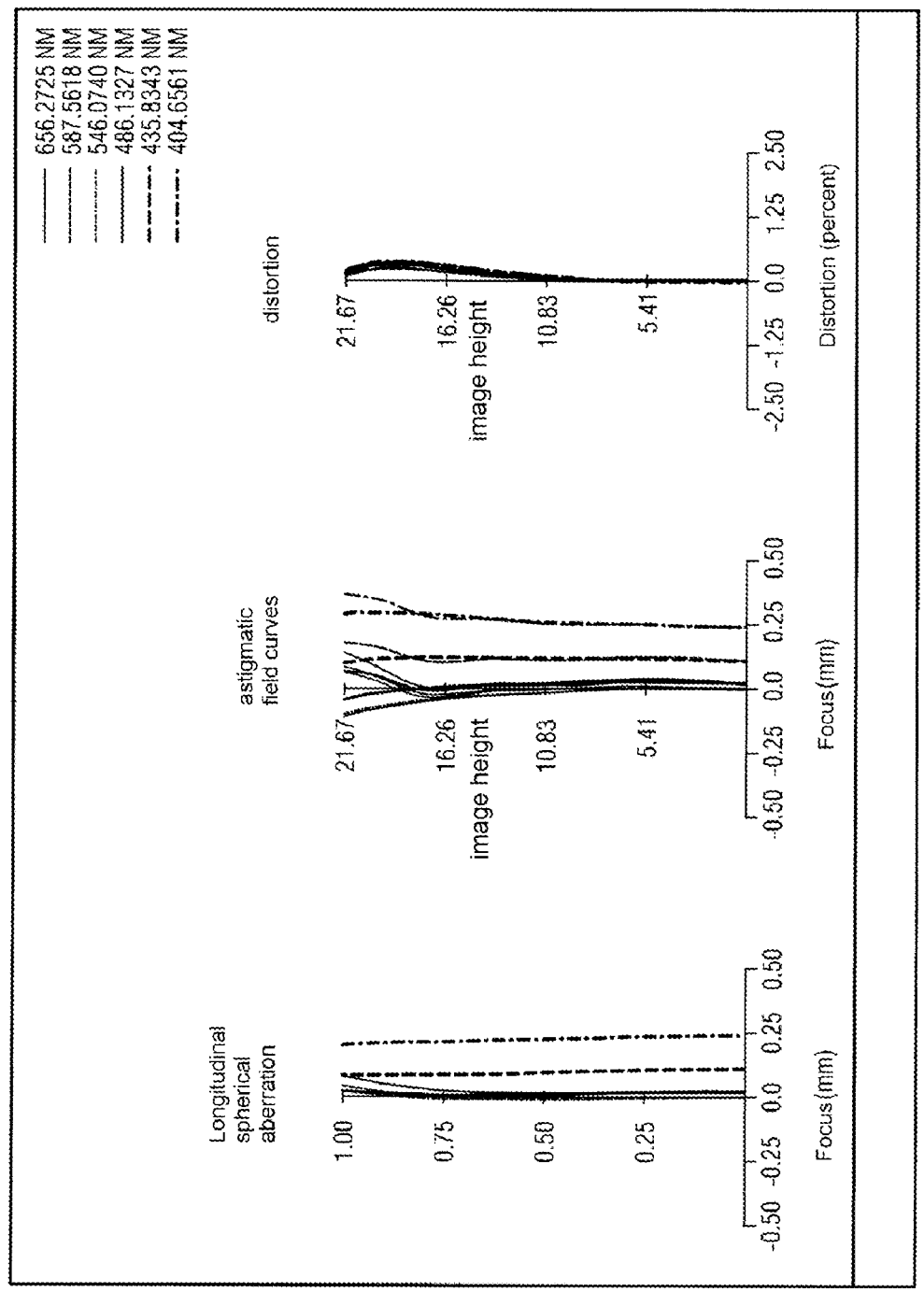
FIG. 10 shows an illustrative example of the spherical aberration, the astigmatism and the distortion for the camera lens 1 of the second embodiment.

The left-hand diagram of FIG. 10 shows the spherical aberration for the camera lens 1 in the second embodiment. For the purposes of describing the spherical aberration, the height of incidence is given as a function of the back focal length difference or the focus. Furthermore, the spherical aberration is illustrated in dependence on different wavelengths of visible light. Here, the wavelengths are between 404.6561 nm and 656.2725 nm. The spherical aberration of the camera lens 1 of the second embodiment is corrected extraordinarily well for larger wavelengths of the visible light.

The astigmatism of the camera lens 1 of the second embodiment can be seen well in the centre diagram of FIG. 10. For different wavelengths of the visible light it can be seen that the astigmatism has been corrected very well with respect to larger wavelengths of the visible light. The range of the wavelengths used is identical to those in the left-hand diagram.

The distortion of the camera lens 1 of the second embodiment is plotted over the image height in the right-hand diagram of FIG. 10. What can be seen here as compared to the first embodiment is that the distortion is lower and is corrected extraordinarily well in this embodiment. As compared to the first embodiment, the camera lens 1 of the second embodiment is slightly more dependent on the wavelength of the visible light in the correction of the distortion. The range of the wavelengths used is identical to those in the left-hand diagram.

Figure 11:
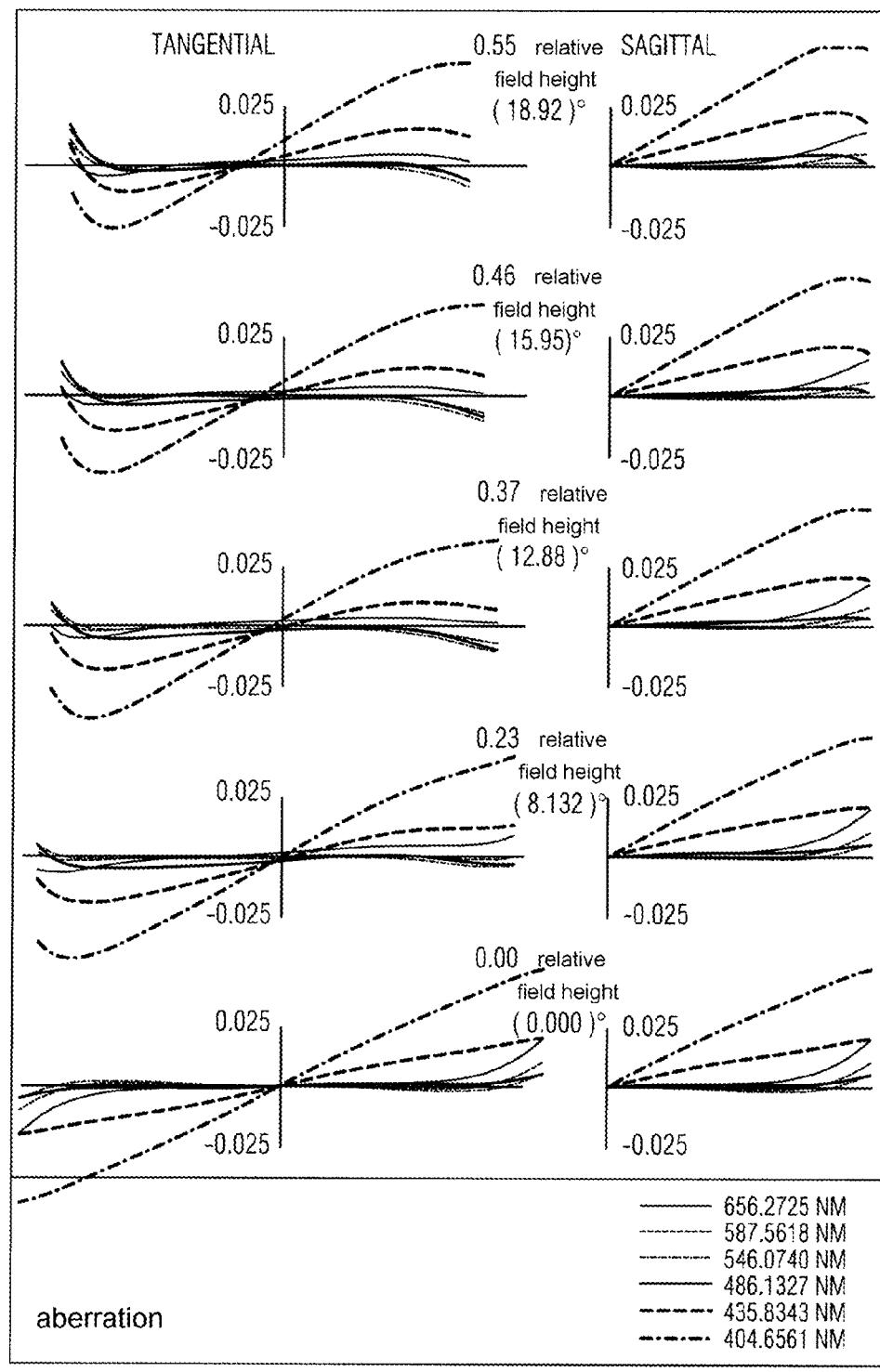
FIGS. 11 and 12 show an illustrative example of the lateral chromatic aberration diagrams for the camera lens 1 of the second embodiment.
Figure 12:
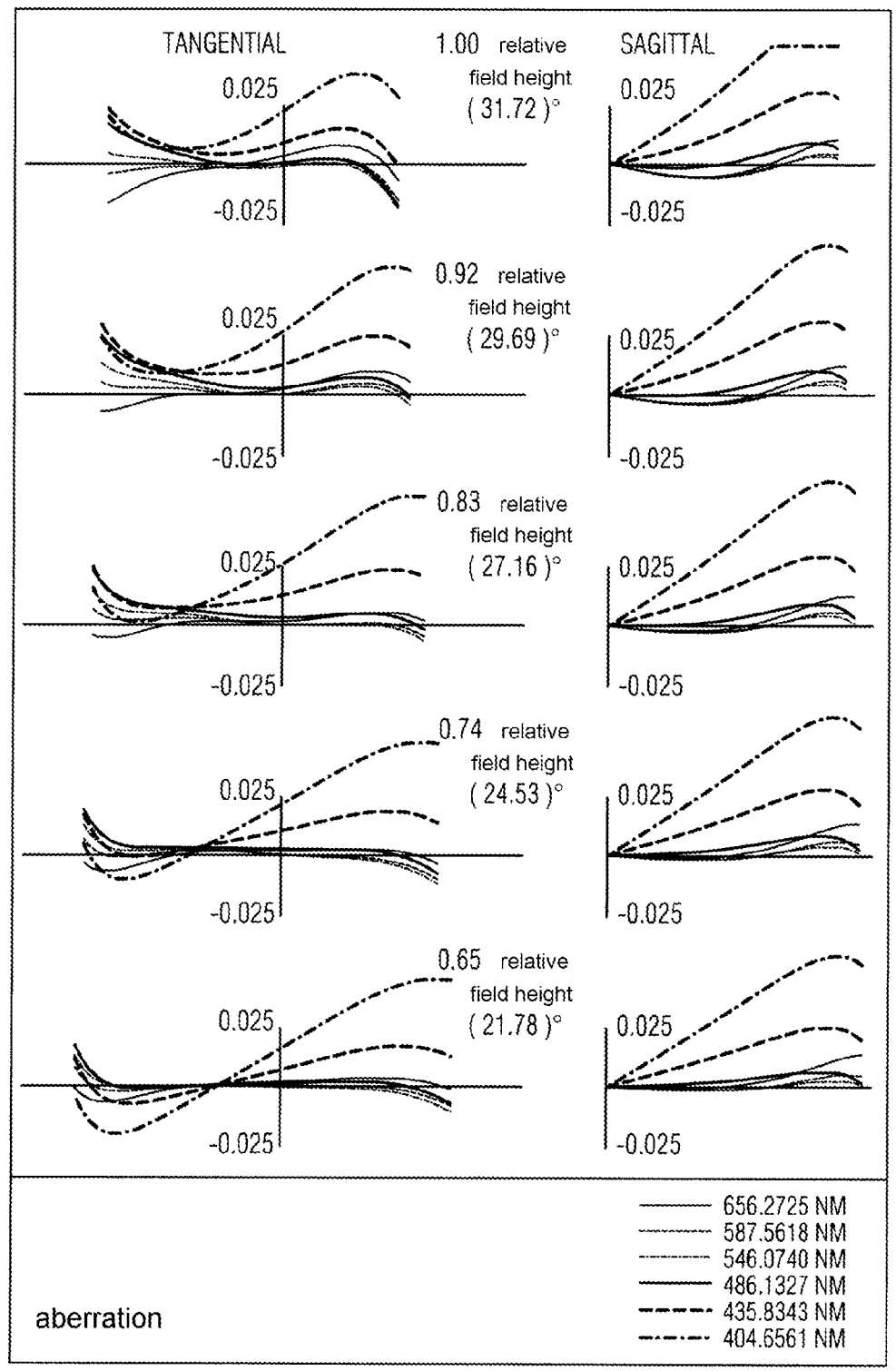

FIGS. 11 and 12 show the typical lateral chromatic aberration diagrams for the camera lens 1 of the second embodiment.

Table 7 gives the basic construction data pertaining to the camera lens 1 of the second embodiment. The setup of the table corresponds to the setup of the table from the first embodiment. The surfaces of the lens elements BF2 to BF22 are shown in FIGS. 7 and 8.

TABLE 7

| Surface | Surface type | Vertex radius of the surface curvature | Distance from the following surface (air gap or lens element thickness) | Trade name with manufacturer information | Semidiameter of the optically used surface |
|---|---|---|---|---|---|
| Object | spherical | infinite | infinite | | |
| BF1 | spherical | infinite | 10.00 | | 16.22748 |
| BF2 | spherical | −45.77944 | 3.55600 | SNSL3_OHARA | 10.84286 |
| BF3 | spherical | 62.39559 | 3.07648 | SLAH59_OHARA | 9.42220 |
| BF4 | spherical | −42.91742 | 1.71903 | | 9.10000 |
| BF5 | spherical | −25.07492 | 1.20000 | SNBH53_OHARA | 8.83291 |
| BF6 | spherical | 350.44048 | 0.20000 | | 9.04776 |
| BF7 | spherical | 37.78687 | 3.54274 | SLAH59_OHARA | 9.26635 |
| BF8 | spherical | −37.78687 | 0.20000 | | 9.24109 |
| Aperture 40 | spherical | infinite | 7.52194 | | 8.90000 |
| BF10 | spherical | −19.50435 | 1.10112 | SNBH53_OHARA | 7.40000 |
| BF11 | spherical | 37.56866 | 3.16936 | SLAH59_OHARA | 8.00000 |
| BF12 | spherical | −37.56866 | 3.85243 | | 8.54875 |
| BF13 | spherical | 51.91541 | 2.63986 | SLAH59_OHARA | 11.69392 |
| BF14 | spherical | −341.09114 | 11.61717 | | 11.84371 |
| BF15 | aspheric | 1.15961e+08 | 4.00000 | LLAL13_OHARA | 14.02117 |
| BF16 | aspheric | −37.34927 | 5.40388 | | 14.71969 |
| BF17 | aspheric | −16.71775 | 2.20000 | LLAM69_OHARA | 15.11816 |
| BF18 | aspheric | −115.51557 | 0.50000 | | 18.42381 |
| BF19 | spherical | infinite | 1.20000 | BK7_Schott | 20.20252 |
| BF20 | spherical | infinite | 0.50000 | | 20.49157 |
| BF21 | spherical | infinite | 0.80000 | BK7_Schott | 20.68155 |
| BF22 | spherical | infinite | 2.00000 | | 20.87425 |
| Image | spherical | infinite | 0.00000 | | 21.65028 |

The focal length of the optical unit is exactly 35.00 mm at an object distance equal to infinity. During focusing to other object distances, the air gaps between the surfaces BF9, BF12 and BF16 change in accordance with table 7 (interpolation should be carried out accordingly between the explicitly stated distances). The surface 0 in the following table 8 is the plane of the object.

TABLE 8

|  | Setting Z1 | Setting Z2 | Setting Z3 | Setting Z4 |
| --- | --- | --- | --- | --- |
| 0 | infinite | 930 | 430 | 230 |
| BF9 | 7.52194 | 7.32428 | 7.04686 | 6.54260 |
| BF12 | 3.85243 | 2.95525 | 2.04406 | 0.80000 |
| BF16 | 5.40388 | 6.49871 | 7.68732 | 9.43564 |

The associated coefficients of the aspheric surfaces are given in tables 9, 10, 11, 12 in accordance with the definition equation of the vertex form. Table 9 here shows the asphere coefficients of the surface BF15, table 10 shows the asphere coefficients of the surface BF16, table 11 shows the asphere coefficients of the surface BF17, and table 12 shows the asphere coefficients of the surface BF18 of the second embodiment.

TABLE 9

| Parameter | Value |
| --- | --- |
| Vertex radius | 1.1596098512e+08 |
| "Conic" constant | 0.00 |
| 4th order - coefficient A | −4.3117941387e−05 |
| 6th order - coefficient B | −8.9700219676e−08 |
| 8th order - coefficient C | −2.2461040723e−10 |
| 10th order - coefficient D | 2.3276084439e−12 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

TABLE 10

| Parameter | Value |
| --- | --- |
| Vertex radius | −3.7349268563e+01 |
| "Conic" constant | 0.00 |
| 4th order - coefficient A | −1.2282414275e−05 |
| 6th order - coefficient B | −1.2762723367e−07 |
| 8th order - coefficient C | 4.2266536101e−10 |
| 10th order - coefficient D | 3.1102010688e−13 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

TABLE 11

| Parameter | Value |
| --- | --- |
| Vertex radius | −1.6717751953e+01 |
| "Conic" constant | 0.00 |
| 4th order - coefficient A | 6.7588224319e−05 |
| 6th order - coefficient B | −3.4374752518e−07 |
| 8th order - coefficient C | 1.7550048279e−09 |
| 10th order - coefficient D | −2.9757540237e−12 |
| 12th order - coefficient E | 0.00 |
| 14th order - coefficient F | 0.00 |
| 16th order - coefficient G | 0.00 |

TABLE 11-continued

| Parameter | Value |
| --- | --- |
| 18th order - coefficient H | 0.00 |
| 20th order - coefficient J | 0.00 |

TABLE 12

| Parameter | Value |
| --- | --- |
| Vertex radius | −1.1551556639e+02 |
| "Conic" constant | 0.00 |
| 4th order - coefficient A | 1.8971818565e−06 |
| 6th order - coefficient B | −1.5805381457e−07 |
| 8th order - coefficient C | 4.9706626928e−10 |
| 10th order - coefficient D | −7.4084714043e−13 |
| 12th order - coefficient E | 0.00 |
| 14th order - coefficient F | 0.00 |
| 16th order - coefficient G | 0.00 |
| 18th order - coefficient H | 0.00 |
| 20th order - coefficient J | 0.00 |

The system described herein has been described in detail on the basis of illustrative embodiments for explanation purposes. It is possible for individual features of the different embodiments to be combined with one another, and so the invention should not be restricted to a combination of features disclosed in certain embodiments. In addition, it is possible to deviate from the illustrative embodiments. For example, fewer than 8 or 9 lens elements may be present. Therefore, the invention is not intended to be restricted to the illustrative embodiments. Other embodiments of the invention will be apparent to those skilled in the art from a consideration of the specification and/or an attempt to put into practice the invention disclosed herein. It is intended that the specification and examples be considered as illustrative only, with the true scope and spirit of the invention being indicated by the following claims.

What is claimed is:

1. A camera lens comprising:
   a first compound lens leading on an object side;
   a second compound lens following the first compound lens;
   a third compound lens that terminates on a sensor side and follows the second compound lens; and
   an aperture stop arranged between the first compound lens and the second compound lens, wherein:
   the first compound lens has a converging refractive power,
   the second compound lens comprises at least two lens elements which are arranged movably along an optical axis, and
   the third compound lens has at least one aspheric lens element which is arranged fixedly in a longitudinal direction of the optical axis to set an exit pupil position, and the aspheric lens element has a diameter of at least 25 mm.

2. The camera lens according to claim 1, wherein the aspheric lens element of the third compound lens is without inflection points at least in the optically used region.

3. The camera lens according to claim 1, wherein the second compound lens has a converging refractive power.

4. The camera a lens according to claim 1, wherein the second compound lens comprises at least one object-side partial compound lens and at least one image-side partial compound lens along the optical axis, wherein the object-side partial compound lens has a diverging refractive power and the image side partial compound lens has a converging refractive power.

5. The camera lens according to claim 4, wherein the object-side partial compound lens and the image-side partial compound lens are differently displaceable along the optical axis.

6. The camera lens according to claim 5, wherein the object-side partial compound lens and the image-side partial compound lens are arranged to be displaceable such that they move in the same direction when focusing at shorter object distances.

7. The camera lens according to claim 6, wherein the focusing travel of the image-side partial compound lens is greater by a factor of between 2 and 3 with respect to the focusing travel of the object-side partial compound lens.

8. The camera lens according to claim 1, wherein the second compound lens has at least one aspheric lens element.

9. The camera lens according to claim 8, wherein the at least one aspheric lens element of the second compound lens is without inflection points at least in the optically used region.

10. The camera lens according to claim 9, wherein the image-side partial compound lens includes the at least one aspheric lens element without inflection points of the second compound lens and wherein the second compound lens has a converging refractive power.

11. The camera lens according to claim 8, wherein the at least one aspheric lens element of the second compound lens has angles of inclination of less than or equal to 60° along the aspheric surfaces thereof.

12. The camera lens according to claim 8, wherein the at least one aspheric lens element of the second compound lens is formed from a glass of low transition temperature that is suitable for blank pressing.

13. The camera lens according to claim 8, wherein the at least one aspheric lens element of the second compound lens comprises at least one aspheric surface having an optical refractive power with a strong progression towards the margin.

14. The camera lens according to claim 13, wherein the refractive power of a beam at the field margin is greater by at least a factor of 5 than the refractive power of a beam in the field centre.

15. The camera lens according to claim 8, wherein the at least one aspheric lens element is a bi-aspheric lens element.

16. The camera lens according to claim 1, wherein the converging refractive power of the first compound lens is at least 0.8 times the total lens refractive power.

17. The camera lens according to claim 1, wherein the first compound lens comprises at least one object-side partial compound lens and at least one image-side partial compound lens along the optical axis, wherein the object-side partial compound lens has a diverging refractive power and the image side partial compound lens has a converging refractive power.

18. The camera lens according to claim 1, wherein the first compound lens is arranged immovably along the optical axis.

19. The camera lens according to claim 1, wherein the at least one aspheric lens element of the third compound lens has angles of inclination of less than or equal to 60° along the aspheric surfaces thereof.

20. The camera lens according to claim 1, wherein the at least one aspheric lens element of the third compound lens is formed from a glass of low transition temperature that is suitable for blank pressing.

21. The camera lens according to claim 1, wherein the at least one aspheric lens element of the third compound lens comprises at least one aspheric surface having an optical refractive power with a strong progression towards the margin.

22. The camera lens according to claim 21, wherein the refractive power of a beam at the field margin has at least a factor of 5 with respect to the refractive power of a beam in the field centre.

23. The camera lens according to claim 1, wherein the at least one aspheric lens element of the third compound lens is arranged as the last lens element in the beam direction.

24. The camera lens according to claim 1, wherein the at least one aspheric lens element of the third compound lens is a bi-aspheric lens element.

25. The camera lens according to claim 23, wherein the third compound lens consists exclusively of the bi-aspheric lens element.

26. The camera lens according to claim 1, wherein the entrance pupil of the camera lens is close to the first lens element, wherein the close proximity of the entrance pupil to the first lens element is given by the requirement $x/L<=0.2$, wherein x designates the distance from the first lens element vertex to the centre of the entrance pupil, and L designates the structural length of the lens.

27. The camera lens of claim 1, wherein the camera lens is for a full-frame camera.

28. An apparatus comprising:
a camera lens having a first compound lens leading on the object side, a second compound lens following the first compound lens; a third compound lens that terminates on the sensor side and follows the second compound lens, and an aperture stop arranged between the first compound lens and the second compound lens, wherein the first compound lens has a converging refractive power, the second compound lens comprises at least two lens elements which are arranged movably along the optical axis, and
the third compound lens has at least one aspheric lens element which is arranged fixedly in the longitudinal direction of the optical axis to set an exit pupil position, and the aspheric lens element has a diameter of at least 25 mm; and
an optics attachment connected in front of the camera lens.

29. A camera comprising:
a camera lens having a first compound lens leading on the object side, a second compound lens following the first compound lens, a third compound lens that terminates on the sensor side and follows the second compound lens, and an aperture stop arranged between the first compound lens and the second compound lens, wherein:
the first compound lens has a converging refractive power,
the second compound lens comprises at least two lens elements which are arranged movably along the optical axis, and
the third compound lens has at least one aspheric lens element which is arranged fixedly in the longitudinal direction of the optical axis to set an exit pupil position, and the aspheric lens element has a diameter of at least 25 mm.

30. The camera of claim 29, wherein the camera is a full-frame camera.

31. The camera of claim 29, wherein the camera is a still or film camera.

* * * * *